(12) United States Patent
Kitaura

(10) Patent No.: US 8,144,121 B2
(45) Date of Patent: Mar. 27, 2012

(54) METHOD AND APPARATUS FOR CONTROLLING ELECTRONIC APPLIANCE

(75) Inventor: Masahiro Kitaura, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 910 days.

(21) Appl. No.: 11/907,184

(22) Filed: Oct. 10, 2007

(65) Prior Publication Data

US 2008/0088588 A1    Apr. 17, 2008

(30) Foreign Application Priority Data

Oct. 11, 2006 (JP) ............................. P2006-277140

(51) Int. Cl.
*G09G 5/00* (2006.01)
*G06F 3/041* (2006.01)
*H04N 52/232* (2006.01)

(52) U.S. Cl. .................. 345/156; 345/173; 348/211.13; 348/211.7; 348/211.8; 178/18.01

(58) Field of Classification Search .......... 345/173–178; 178/18.01–18.11
See application file for complete search history.

(56) References Cited

U.S. PATENT DOCUMENTS

| | | | | |
|---|---|---|---|---|
| 5,594,469 A * | 1/1997 | Freeman et al. | ............... | 345/158 |
| 5,617,312 A * | 4/1997 | Iura et al. | ......................... | 700/83 |
| 5,734,928 A * | 3/1998 | Nakasuji | .......................... | 710/67 |
| 5,818,970 A * | 10/1998 | Ishikawa et al. | ............... | 382/248 |
| 6,111,980 A * | 8/2000 | Sano et al. | ..................... | 382/167 |
| 6,115,482 A * | 9/2000 | Sears et al. | ..................... | 382/114 |
| 6,160,899 A * | 12/2000 | Lee et al. | ....................... | 382/103 |
| 6,191,773 B1 * | 2/2001 | Maruno et al. | ................. | 345/158 |
| 6,230,222 B1 * | 5/2001 | Rush | ................................. | 710/67 |
| 6,374,272 B2 * | 4/2002 | Bates et al. | .................... | 715/207 |
| 6,498,628 B2 * | 12/2002 | Iwamura | ....................... | 348/734 |
| 6,501,515 B1 * | 12/2002 | Iwamura | ....................... | 348/734 |
| 6,771,277 B2 * | 8/2004 | Ohba | ............................. | 345/629 |
| 6,901,561 B1 * | 5/2005 | Kirkpatrick et al. | ........... | 715/863 |
| 7,084,884 B1 * | 8/2006 | Nelson et al. | .................. | 345/619 |
| 7,336,265 B2 * | 2/2008 | Tamura et al. | ................. | 345/173 |
| 7,441,198 B2 * | 10/2008 | Dempski et al. | ............... | 715/757 |
| 7,472,047 B2 * | 12/2008 | Kramer et al. | ..................... | 703/6 |
| 7,629,959 B2 * | 12/2009 | Kitaura | ....................... | 345/156 |
| 7,786,982 B2 * | 8/2010 | Tamura et al. | ................. | 345/173 |
| 7,825,904 B2 * | 11/2010 | Hino | ............................. | 345/173 |
| 7,839,389 B2 * | 11/2010 | Nishimura et al. | ........... | 345/169 |
| 2006/0077183 A1 * | 4/2006 | Studt | ............................. | 345/173 |

FOREIGN PATENT DOCUMENTS

JP       2006-091948        4/2006
WO     WO 2006/037786    *  4/2006

* cited by examiner

*Primary Examiner* — Richard Hjerpe
*Assistant Examiner* — Alecia D English
(74) *Attorney, Agent, or Firm* — The Nath Law Group; Jerald L. Meyer; Jiaxiao Zhang

(57) ABSTRACT

An apparatus for controlling an electronic appliance having a display is provided. A plurality of control buttons are displayed on the display. An operator in front of the display is photographed with a video camera and is displayed on the display. The operator holds his or her hand to specify one of the control buttons on the display. The control buttons are provided with numbers or marks according to the order of priority. A feature detector of the apparatus detects various features from the photographed image. According to the features, a controller of the apparatus selects one of the control buttons on which the hand of the operator is superimposed and carries out an operation corresponding to the selected control button with respect to the electronic appliance.

8 Claims, 23 Drawing Sheets

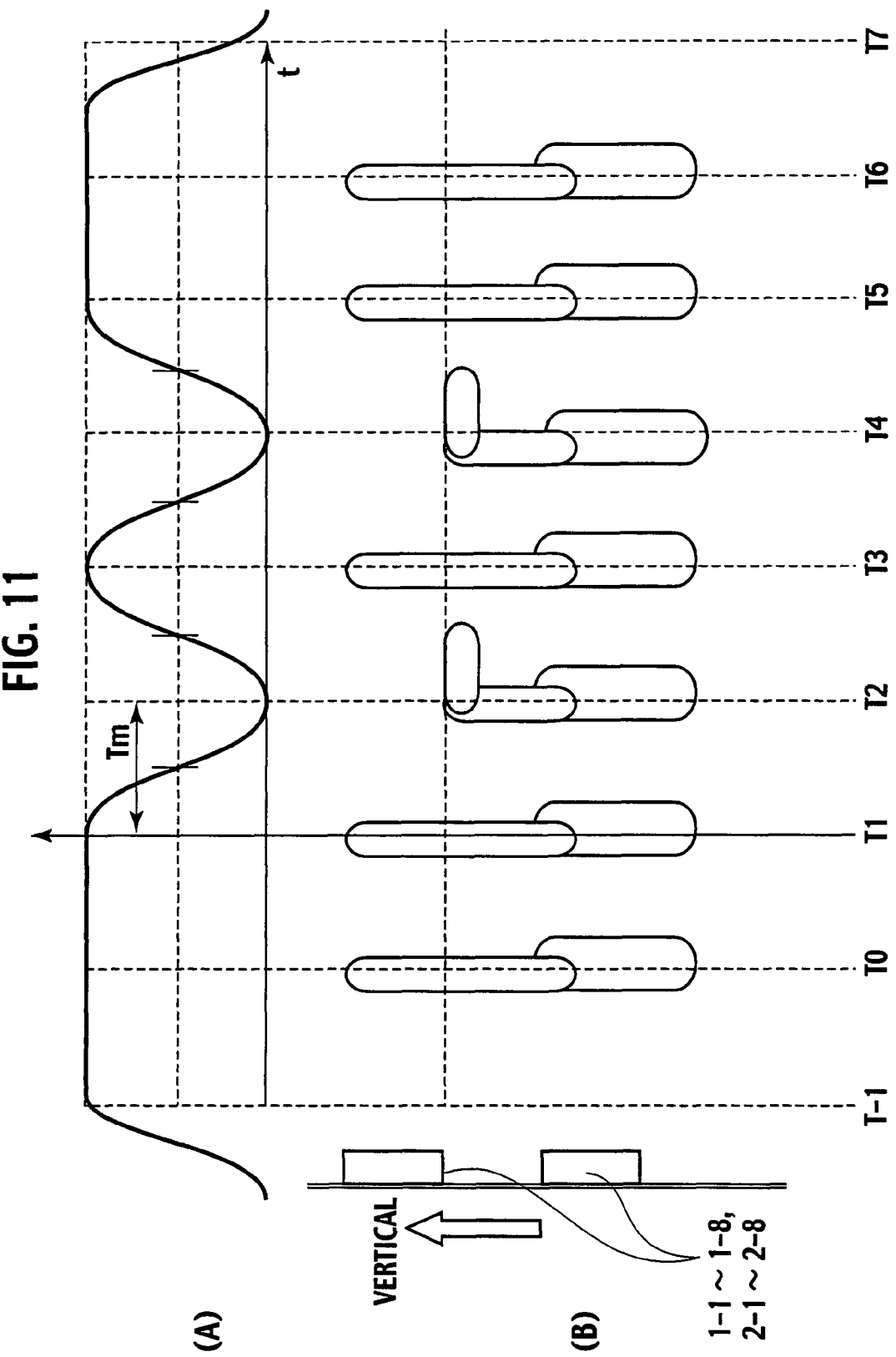

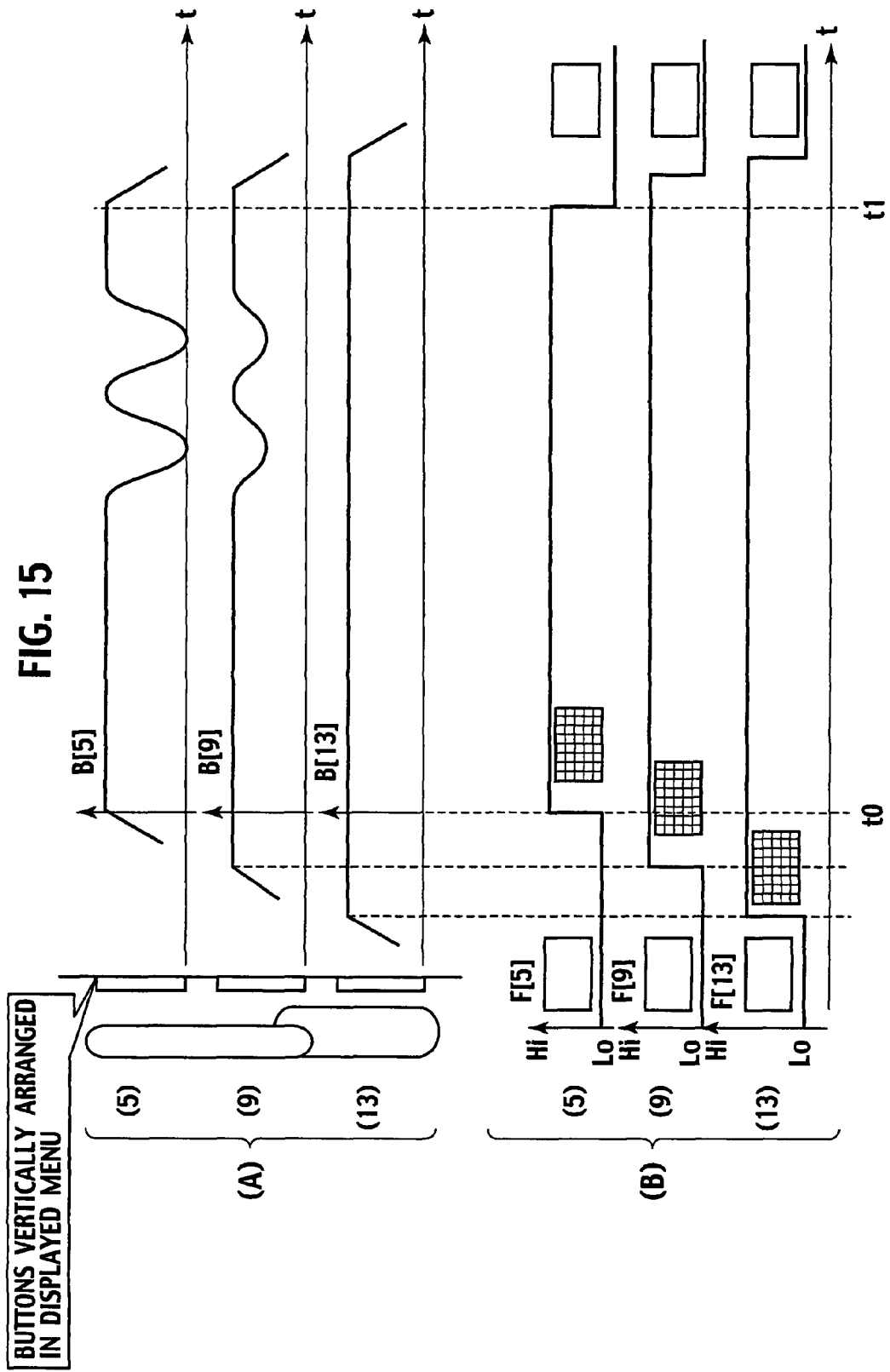

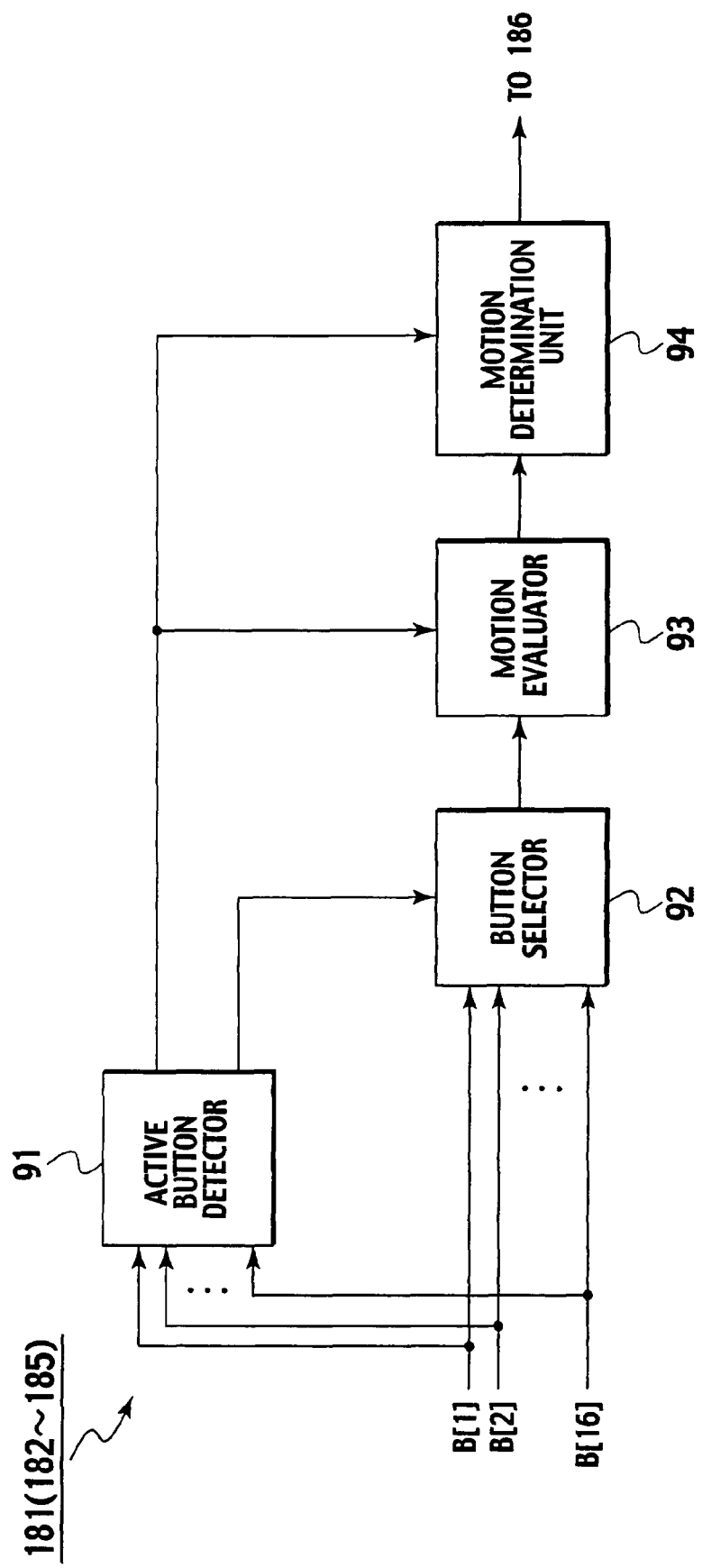

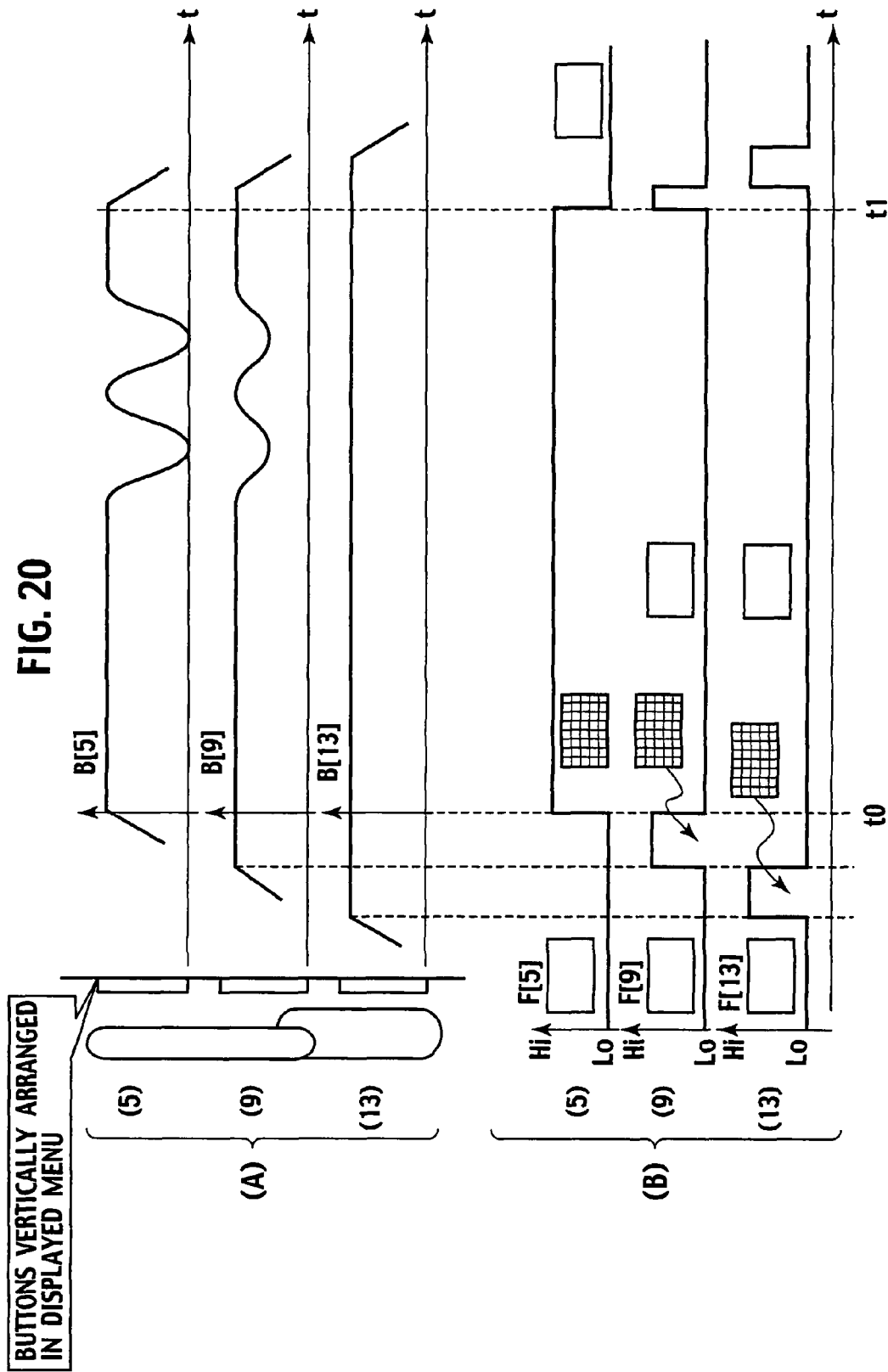

101 1ST SEGMENT | 102 2ND SEGMENT 101 1ST SEGMENT | 102 2ND SEGMENT

1ST SEGMENT
105        107 3RD SEGMENT 106        108
2ND SEGMENT  4TH SEGMENT 112 2ND SEGMENT

1ST SEGMENT    4TH SEGMENT
111            114

113        116
3RD SEGMENT  6TH
             SEGMENT
115
5TH SEGMENT

METHOD AND APPARATUS FOR CONTROLLING ELECTRONIC APPLIANCE

BACKGROUND OF THE INVENTION

1. Field of the Invention

The present invention relates to an electronic appliance having a display, such as a television set and a personal computer, provided with an improved remote control function, and particularly, to a method of and an apparatus for controlling such an electronic appliance.

2. Description of Related Art

In the 1980s, infrared remote controllers started to be attached to home appliances such as television sets. The remote controllers have widely accepted and greatly changed the usage of home appliances. At present, controlling electronic appliances with remote controllers is in the mainstream. The remote controller basically employs a one-key (one-button), one-function operation. A remote controller for the television set, for example, has ON/OFF, CHANNEL, VOLUME, and INPUT SELECT keys for conducting respectively assigned functions. The remote controller is very useful for remotely controlling the television set and electronic devices connected to the television set.

Data broadcasting that has started recently requires a remote controller to be provided with UP, DOWN, LEFT, RIGHT, and OK keys, and the user must push these keys several times to display a required menu. Manipulating a number of keys is troublesome for the user. An EPG (electronic program guide) displays a matrix of guides on the television set and prompts the user to select a desired one of the guides by pushing keys on the remote controller. This is also troublesome for the user.

A related art proposed by this applicant in Japanese Unexamined Patent Application Publication No. 2006-091948 discloses a remote-control technique that uses no remote controller at hand and is flexibly applicable to a variety of electronic apparatuses. This technique employs a video camera to photograph the hand of a user moved with respect to a control button displayed on a display, and according to the hand's motion, identifies a control operation assigned to the control button.

This related art is capable of correctly detecting a hand motion of the user carried out with respect to a control button displayed on a display. The related art, however, is not good at correctly detecting an objective control button specified by a hand of the user on the display if the hand is over a plurality of control buttons including the objective control button, or if the hand and other objects such as the head of the user are superimposed on a plurality of control buttons including the objective control button.

SUMMARY OF THE INVENTION

An object of the present invention is to provide a method of and an apparatus for controlling an electronic appliance having a display, capable of surely detecting an operation conducted by a user with respect to a control button displayed on the display.

In order to accomplish the object, a first aspect of the present invention provides an apparatus for controlling an electronic appliance having a display. The apparatus includes a video camera configured to photograph an operator who is in front of the display and operates the electronic appliance; a mirror image converter configured to convert the image provided by the video camera into a mirror image; an operational image generator configured to generate an operational image containing a plurality of control buttons for controlling the electronic appliance; a mixer configured to mix the operational image with the mirror image into a mixed image to be displayed on the display; a detector configured to have a plurality of detection zones corresponding to the plurality of control buttons respectively for the image provided by the video camera, detect whether the operator displayed on the display overlays an item on any of the plurality of detection zones to operate any of the control buttons based on images of the detection zones, and generate a detection signal; a controller configured to set order of priority on the plurality of detection zones, and if it is determined on the basis of the detection signals that a plurality of control buttons are operated by the operator displayed on the display, generate a control signal for controlling the electronic appliance based on a detection signal from a detection zone having a highest priority among the detection zones corresponding the plurality of control buttons operated by the operator, and if it is determined on the basis of the detection signals that only one control button is operated by the operator, generate a control signal for controlling the electronic appliance based on a detection signal from a detection zone corresponding to the one control button.

A second aspect of the present invention provides an apparatus for controlling an electronic appliance having a display. The apparatus includes a video camera configured to photograph an operator who is in front of the display and operates the electronic appliance; a mirror image converter configured to convert the image provided by the video camera into a mirror image; an operational image generator configured to generate an operational image containing a plurality of control buttons for controlling the electronic appliance; a mixer configured to mix the operational image with the mirror image into a mixed image to be displayed on the display; a detector configured to have a plurality of detection zones corresponding to the plurality of control buttons respectively for the image provided by the video camera and generate first detection signals indicating whether the operator displayed on the display overlays an item on any of the plurality of detection zones based on images of the detection zones and second detection signals indicating whether the operator operates any of the control buttons corresponding to detection zones on which the item is overlaid based on the images of the detection zones; and a controller configured to group the plurality of detection zones into a plurality of zones on the display, set order of priority on the detection zones included in each zone on the display, and if it is determined on the basis of the first detection signals that a plurality of detection zones are overlaid with the item by the operator displayed on the display, obtain a first detection signal from a detection zone having a highest priority for each zone on the display and generate a control signal for controlling the electronic appliance according to a control button a corresponding to a detection zone that has generated a second signal among the detection zones each having a highest priority in each zone on the display.

According to a third aspect of the present invention that is based on any one of the first and second aspects, the detector includes a color filter configured to extract an area having a specific color from the mirror image, the extracted area being used to detect the item overlaid on the detection zones.

According to a fourth aspect of the present invention that is based on the third aspect, the detector further includes a gradation limiter configured to extract an area having a predetermined gradation range from the mirror image; and a synthesizer configured to extract an area corresponding to the item according to the area extracted by the color filter and the area extracted by the gradation limiter.

According to a fifth aspect of the present invention that is based on the fourth aspect, the detector further includes a gate configured to provide areas other than the item area extracted by the synthesizer with one of a specific brightness and a specific color.

A sixth aspect of the present invention provides a method of controlling an electronic appliance having a display. The method includes photographing an operator who is in front of the display and operates the electronic appliance; converting the photographed image into a mirror image; generating an operational image containing a plurality of control buttons for controlling the electronic appliance, wherein have a plurality of detection zones corresponding to the plurality of control buttons respectively for the image provided by the video camera and order of priority is set on the plurality of detection zones; mixing the operational image with the mirror image into a mixed image to be displayed on the display; detecting whether the operator displayed on the display overlays an item on any of the plurality of detection zones to operate any of the control buttons based on images of the detection zones and generating detection signals; and if it is determined on the basis of the detection signals that a plurality of control buttons are operated by the operator displayed on the display, generating a control signal for controlling the electronic appliance based on a detection signal from a detection zone having a highest priority among the detection zones corresponding the plurality of control buttons operated by the operator, and if it is determined on the basis of the detection signals that only one control button is operated by the operator, generating a control signal for controlling the electronic appliance based on a detection signal from a detection zone corresponding to the one control button.

A seventh aspect of the present invention provides a method of controlling an electronic appliance having a display. The method includes photographing an operator who is in front of the display and operates the electronic appliance; converting the photographed image into a mirror image; generating an operational image containing a plurality of control buttons for controlling the electronic appliance, wherein a plurality of detection zones corresponding to the plurality of control buttons respectively for the image provided by the video camera, and the plurality of detection zones are grouped into a plurality of zones on the display, and order of priority is set on the detection zones included in each zone on the display; mixing the operational image with the mirror image into a mixed image to be displayed on the display; generating first detection signals indicating whether the operator displayed on the display overlays an item on any of the plurality of detection zones based on images of the detection zones and second detection signals indicating whether the operator operates any of the control buttons corresponding to detection zones on which the item is overlaid based on the images of the detection zones; and if it is determined on the basis of the first detection signals that a plurality of detection zones are overlaid with the item by the operator displayed on the display, obtaining a first detection signal from a detection zone having a highest priority for each zone on the display and generating a control signal for controlling the electronic appliance according to a control button a corresponding to a detection zone that has generated a second signal among the detection zones each having a highest priority in each zone on the display.

According to an eighth aspect of the present invention that is based on any one of the sixth and seventh aspects, detecting, from among the control zones includes extracting an area having a specific color from the mirror image, the extracted area being used to detect the item overlaid on the detection zones.

According to a ninth aspect of the present invention that is based on the eighth aspect, detecting, from among the control zones further includes extracting an area having a predetermined gradation range from the mirror image; and extracting an area corresponding to the item according to the extracted specific color area and the extracted specific gradation range area.

According to a tenth aspect of the present invention that is based on the ninth aspect, detecting, from among the control zones further includes providing areas other than the item area extracted by the synthesizer with one of a specific brightness and a specific color.

In this way, the present invention can surely detect an operation conducted by an operator with respect to one of control zones or control buttons displayed on a display.

The nature, principle and utility of the invention will become more apparent from the following detailed description when read in conjunction with the accompanying drawings.

BRIEF DESCRIPTION OF THE DRAWINGS

In the accompanying drawings:

FIG. 11 is a view showing changes in the area of a hand detected by the object extractor of FIG. 7 and corresponding motions of the hand;

FIG. 15 is a view showing the control buttons activated by the hand in FIGS. 14A and 14B;

FIG. 18 is a block diagram showing another example of one of the motion detectors;

FIG. 20 is a view showing the control buttons activated by the hand in FIGS. 14A and 14B;

DETAILED DESCRIPTION OF EMBODIMENTS

Figure 1:
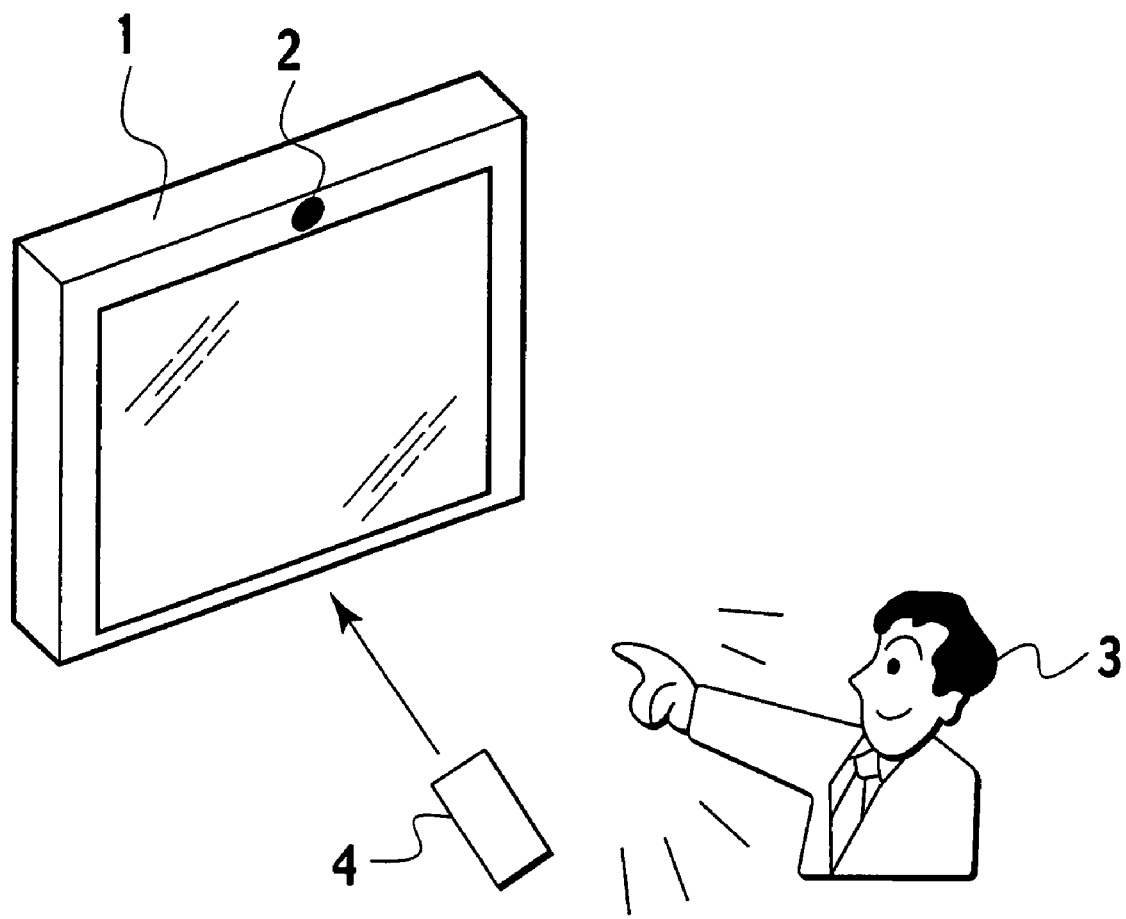
FIG. 1 is a view explaining a difference in operating an electronic appliance between a related art that uses a remote controller and the present invention that uses an operator's motion.

FIG. 1 shows a difference between an operation using a remote controller according to a related art and an operation according to the present invention. A user (operator) 3 operates a television set 1 that is an example of an electronic appliance.

According to the related art, the user 3 must hold the remote controller 4, direct the remote controller 4 toward the television set 1, and push a key of required function on the remote controller 4 to control the television set 1. If the remote controller 4 is not present nearby, the user 3 is unable to control the television set 1, and therefore, must feel inconvenience.

On the other hand, the present invention provides the television set 1 with a video camera 2. The video camera 2 photographs the user 3. From an image of the user 3 provided by the video camera 2, a motion of the user 3 is detected and a control operation associated with the detected motion is carried out with respect to the television set 1 or any other device connected to the television set 1.

A motion of the user 3 to be detected as a control motion is a motion of the body (hand, foot, face, and the like) of the user 3 intended to select a necessary one of buttons in a menu displayed on a display 21 of the television set 1. Embodiments of the present invention mentioned below use hand motions to control an electronic appliance. If an environment of the television set 1 is dim, a remote control device (handy controller) having a light emitting function may be employed to carry out a motion equivalent to a hand motion.

Figure 2:
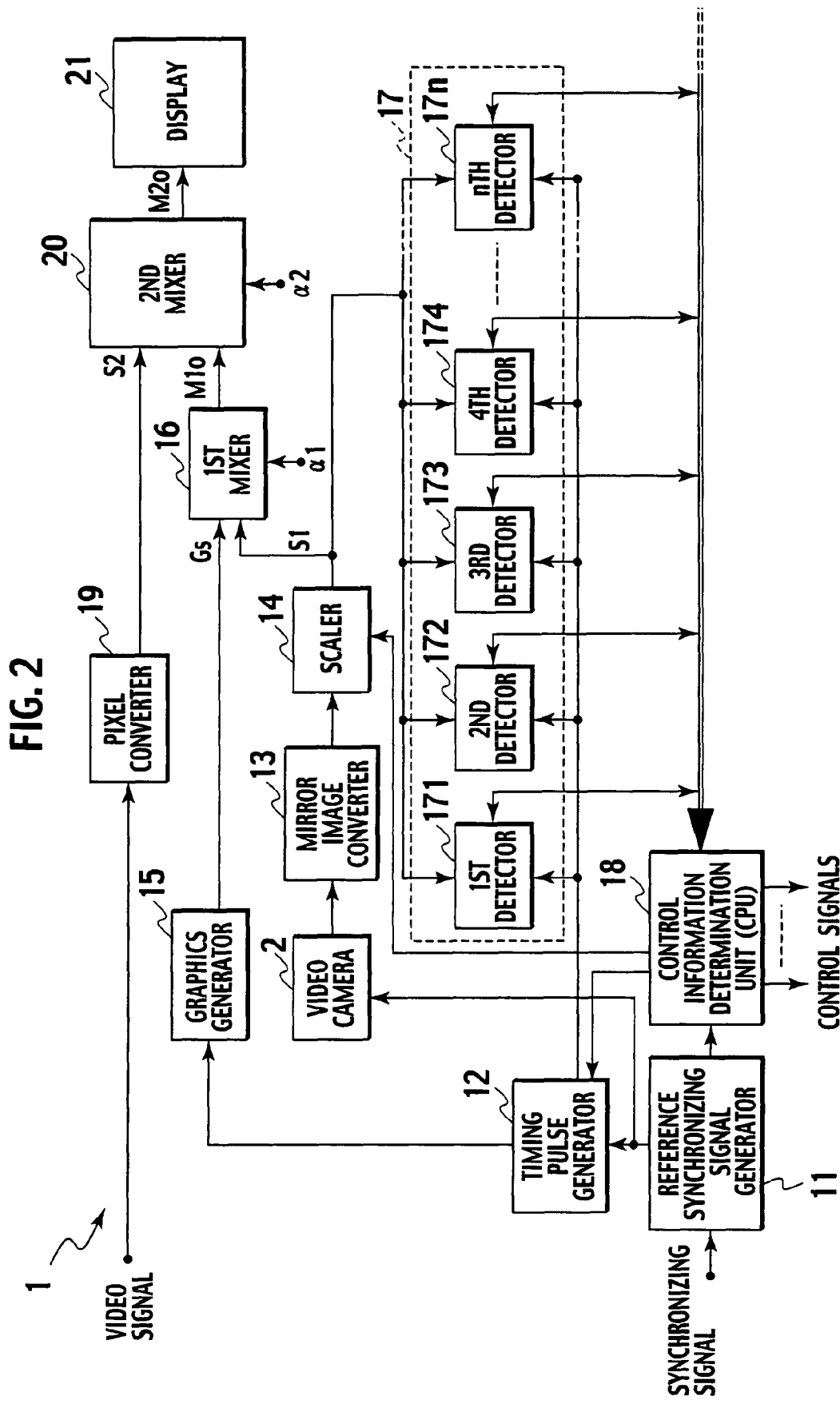
FIG. 2 is a block diagram showing parts of an electronic appliance (television set 1) according to an embodiment of the present invention.

FIG. 2 is a block diagram showing examples of parts in a television set 1 according to an embodiment of the present invention. The television set 1 has a video camera 2, a reference synchronizing signal generator 11, a timing pulse generator 12, a mirror image converter 13, a scaler 14, a graphics generator 15, a first mixer 16, a detection unit 17, a control information determination unit (realized by a CPU, and therefore, hereinafter referred to as CPU) 18, a pixel converter 19, a second mixer 20, and a display 21.

The reference synchronizing signal generator 11 generates, based on input synchronizing signals, horizontal periodic pulses and vertical periodic pulses as reference signals for the television set 1. The input synchronizing signals are contained in video signals supplied to the pixel converter 19. When receiving television broadcasting signals or video signals from an external device, the generator 11 generates pulses synchronized with synchronizing signals contained in the received signals. The timing pulse generator 12 generates pulses having optional phases and widths in horizontal and vertical directions for the respective parts shown in FIG. 2.

The video camera 2 is arranged at a front part of the television set 1 like that shown in FIG. 1 and photographs a user (operator) 3 or an object in front of the television set 1. The video camera 2 outputs a brightness signal (Y) and color difference signals (R-Y, B-Y) in synchronization with the horizontal and vertical periodic pulses provided by the reference synchronizing signal generator 11. According to the embodiment, the number of pixels in an image photographed with the video camera 2 is equal to the number of pixels of the display 21. If they are not equal to each other, a pixel converter must be employed.

The mirror image converter 13 horizontally flips an image (of the user 3) photographed by the video camera 2 into a mirror image to be displayed on the display 21. If the video camera 2 provides an image of a character, it is horizontally inverted like a character reflected from a mirror. The embodiment employs memories to horizontally flip an image into a mirror image. If the display 21 is a CRT (cathode ray tube), a horizontal scanning operation may be reversely carried out to provide a mirror image. In this case, other images or graphics to be mixed with an image from the video camera 2 must be horizontally inverted in advance.

The scaler 14 adjusts (enlarges or reduces) the size of an image photographed by the video camera 2. Under the control of the CPU 18, the scaler 14 two-dimensionally adjusts an expansion ratio or a contraction ratio applied to an image. Instead of expansion or contraction, the scaler 14 may adjust the horizontal and vertical phases of an image.

The graphics generator 15 forms a menu (an operational image) according to a menu signal from the CPU 18. If the menu signal is a primary color signal involving R (red), G (green), and B (blue) signals, the graphics generator 15 generates, from the primary color signal, a Y (brightness) signal and color difference (R-Y, B-Y) signals, which are synthesized or mixed with image signals representative of a photographed image. The number of planes of the generated graphics is optional. In this embodiment, the number of planes is one.

The number of pixels of the generated graphics according to the embodiment is equal to the number of pixels of the display 21. If they are not equal to each other, a pixel converter will be arranged in or after the graphics generator 15 to equalize the pixel numbers.

The first mixer 16 mixes an output signal Gs of the graphics generator 15 with an output signal S1 of the scaler 14 according to a control value α1 that controls a mixing ratio. The first mixer 16 provides an output signal M1o as follows:

$$M1o = \alpha 1 \times S1 + (1-\alpha 1) \times Gs \qquad (1)$$

The control value α1 is set between 0 and 1. As the control value α1 increases, a proportion of the scaler output signal S1 increases and a proportion of the output signal Gs of the graphics generator 15 decreases. This configuration of the mixer does not limit the present invention. The present invention is achievable with any mixer that is configured to receive two systems of signal information. If the scaler 14 is arranged between the video camera 2 and the mirror image converter 13, the mirror image converter 13 will provide the output signal S1.

The detection unit 17 includes a first detector 171, a second detector 172, . . . , and an "n"th detector 17n. The number of detectors in the detection unit 17 is dependent on the number of control buttons contained in the operational image (menu) provided by the graphics generator 15. The control buttons in the menu are associated with control operations to be carried out with respect to the television set 1 or any other device connected to the television set 1.

The CPU (or control information determination unit) 18 analyzes data or detection signals provided by the detection unit 17 and outputs various control signals. Based on the data from the detection unit 17, the CPU 18 generates a control signal corresponding to a manipulated one of the control buttons of the menu, to control a corresponding part of the television set 1. The CPU 18 employs software to conduct various operations. Algorithms of the software will be explained later. To carry out various operations, the embodiment employs hardware (functional blocks) and software (in the CPU 18). Whether a given operation is a hardware executable operation or a software executable operation is not essential for the present invention.

The pixel converter 19 equalizes the number of pixels of an external input signal with the number of pixels of the display 21. The external input signal is a signal coming from the outside of the television set 1, such as a broadcasting television signal (including a data broadcasting signal) received by a built-in tuner (not shown) or a video (VTR) signal. From the external input signal, horizontal and vertical synchronizing signals are extracted, and the reference synchronizing signal generator 11 synchronizes the respective parts of the television set 1 based on the horizontal and vertical synchronizing signals.

The second mixer 20 functions like the first mixer 16. The second mixer 20 mixes the output signal M1o of the first mixer 16 with an output signal S2 of the pixel converter 19 at a control value α2 that controls a mixing ratio. The second mixer 20 provides an output signal M2o as follows:

$$M2o = \alpha 2 \times M1o + (1 - \alpha 2) \times S2 \quad (2)$$

The control value α2 is set between 0 and 1. As the control value α2 increases, a proportion of the output signal M1o from the first mixer 16 increases and a proportion of the output signal S2 from the pixel converter 19 decreases. The mixer 20 is not limited to the above-mentioned configuration. The mixer 20 may employ any configuration that receives two systems of signal information.

The display 21 is, for example, a CRT, an LCD (liquid crystal display), a PDP (plasma display panel), or a projection display. The display 21 may employ any proper display method. The display 21 receives a brightness signal Y and color difference signals R-Y and B-Y, converts them into R, G, and B primary color signals, and displays an image according to the signals.

Figure 3:
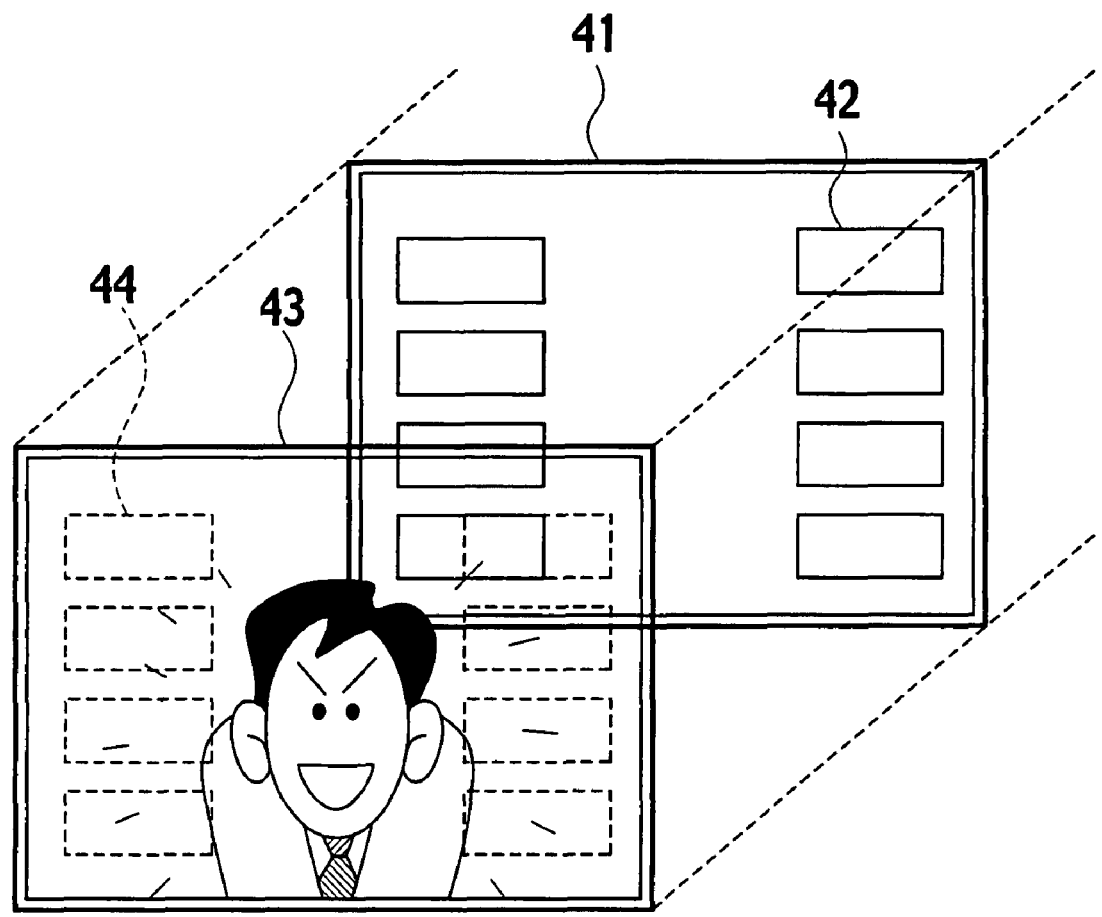
FIG. 3 is a view showing an operator's image and an operational image.

Operation of the television set 1 with the above-mentioned configuration, as well as operation conducted by the user 3 will be explained. FIG. 3 shows a graphics image 41 provided by the graphics generator 15 of FIG. 2 and a scaler output image 43 provided by the scaler 14. The scaler output image 43 is formed by converting an image photographed by the video camera 2 of FIG. 2 into a mirror image and by scaling the mirror image so that the number of pixels of the scaler output image 43 agrees with the number of pixels of the graphics image 41. The first mixer 16 mixes the images 41 and 43 with each other.

The graphics image 41 consists of a menu plane (operational image) used for controlling the television set 1 and devices connected to the television set 1 and includes rectangular push buttons or control buttons 42. The scaler output image 43 includes a mirror image of the user 3 and rectangular frames 44 indicated with dotted lines in FIG. 3. The rectangular frames 44 are detection zones corresponding to the control buttons 42 and the detectors 171 to 17n of the detection unit 17. The frames 44 are positioned to agree with the push buttons 42 of the graphics image 41.

Figure 4:
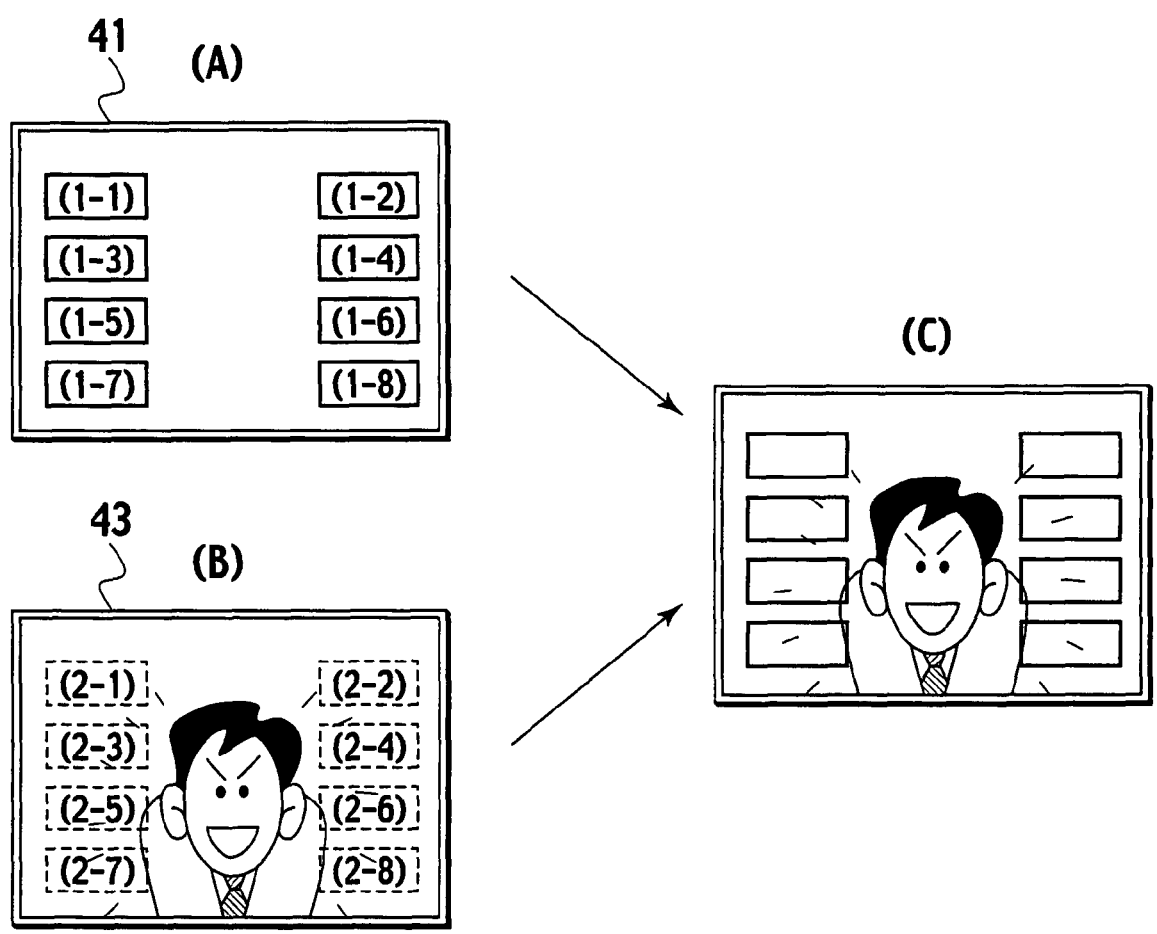
FIG. 4 is a view showing mixing the operator's image and operational image of FIG. 3 with each other into a mixed image.

FIG. 4 shows a mixing process carried out in the first mixer 16. In FIG. 4, a view (A) is the menu (graphics image) 41 generated by the graphics generator 15 and includes the control buttons 1-1 to 1-8. A view (B) of FIG. 4 is the scaler output image 43 containing the image of the user 3 that has been photographed by the video camera 2, mirror-converted by the mirror converter 13, and scaled by the scaler 14. The scaler output image 43 includes the detection zones 2-1 to 2-8 corresponding to the detectors 171 to 17n of the detection unit 17.

A view (C) of FIG. 4 is formed in the first mixer 16 by mixing the views (A) and (B) at a control value α1 representing a mixing ratio. In proportion to the control value α1, the brightness and contrast of the image of the user 3 in the view (C) become lower than those of the view (B).

The superimposed user's mirror image and control menu are displayed on the display 21. As a result, the user 3 can observe on the display 21 each movement of the user 3 together with the control menu including the control buttons 1-1 to 1-8. To control the television set 1, the user 3 moves his or her body (hand) to touch one of the control buttons 1-1 to 1-8 on the display 21.

Touching the control buttons 1-1 to 1-8 does not mean for the user 3 to actually touch the buttons on the display 21. Instead, the user 3 moves his or her hand so that the image of the hand of the user 3 displayed on the display 21 may touch the control buttons 1-1 to 1-8 on the display 21. Namely, the user 3 acts while watching the display 21 so that his or her hand may be superimposed on one of the control buttons 1-1 to 1-8 on the display 21, to activate a control operation assigned to the button and execute the control operation with respect to the television set 1.

When the user 3 conducts an action of pushing one of the control buttons 1-1 to 1-8 on the display 21, the detection unit 17 finds one of the detection zones 2-1 to 2-8 in which the hand is present and with which the pushed button is associated and recognizes that the button has been pushed. The detection unit 17 informs the CPU 18 of the detected result, and the CPU 18 outputs a control signal to carry out a control operation associated with the pushed button. At this time, the shape and/or color of the pushed button on the display 21 may be changed to indicate that the button pushing action has been accepted. For example, the appearance of the pushed button on the display 21 may be changed to a pushed shape.

Figure 5:
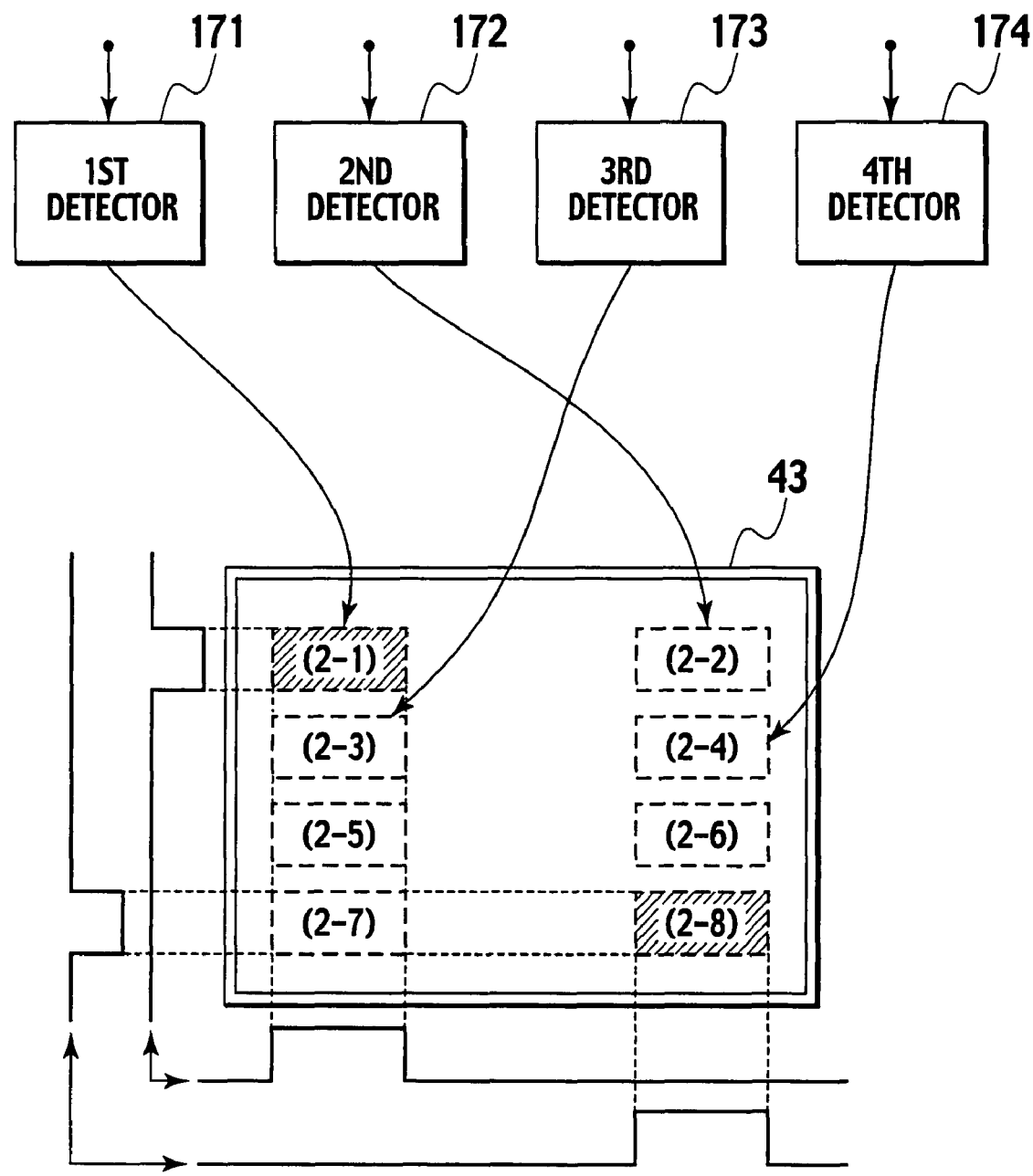
FIG. 5 is a view showing detectors arranged in the electronic appliance of FIG. 2 and corresponding detection zones defined on a display of the electronic appliance.

FIG. 5 shows relationships between the detection zones 2-1 to 2-8 defined in the scaler output image 43 and the detectors 171 to 174 of the detection unit 17. FIG. 5 also shows horizontal and vertical timing pulses used to specify the detection zones 2-1 and 2-8. The timing pulses are generated by the timing pulse generator 12 shown in FIG. 2.

Figure 6:
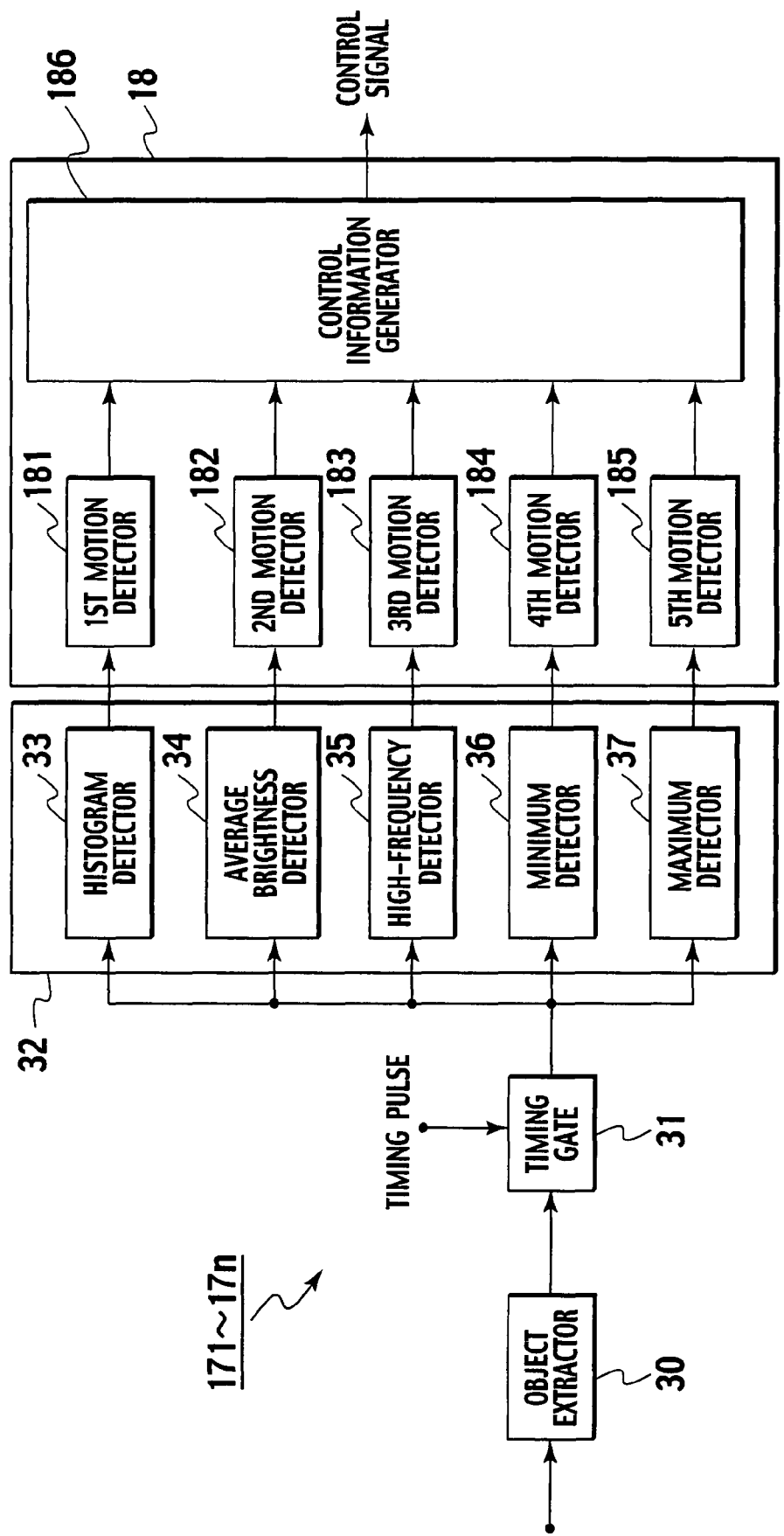
FIG. 6 is a block diagram showing one of the detectors and a control information determination unit (CPU) arranged in the electronic appliance of FIG. 2.

FIG. 6 shows one of the detectors 171 to 17n. The detector includes an object extractor 30, a timing gate 31, and a feature detector 32. The object extractor 30 has filters for filtering the characteristics of an object and provides the timing gate 31 with a filtered image signal.

In response to timing pulses such as those shown in FIG. 5, the timing gate 31 passes an image signal of the corresponding one of the detection zones 2-1 to 2-8. On the image signal passed through the timing gate 31, the feature detector 32 carries out various filtering processes to extract an image of the hand of the user 3 in the corresponding detection zone.

The feature detector 32 includes functional blocks to detect various characteristics from the image signal from the timing gate 31. According to an embodiment of the present invention, the feature detector 32 includes a histogram detector 33, an average brightness (average picture level (APL)) detector 34, a high-frequency detector 35, a minimum detector 36, and a maximum detector 37. An image has various characteristics. According to an embodiment of the present invention, detection signals generated by the detectors 33 to 37 are used by the CPU 18 to identify a hand and recognize a motion of the hand.

The detectors 33 to 37 in the feature detector 32 provide first to fifth motion detectors 181 to 185 formed in the CPU 18 with detection signals, respectively. According to the detection signals, the first to fifth motion detectors 181 to 185 identify a hand and recognize a motion of the hand. Output data from the first to fifth motion detectors 181 to 185 are sent to a control information generator 186 formed in the CPU 18.

The first to fifth motion detectors 181 to 185 store received data as variables and process the data with software. According to an embodiment of the present invention, a process of detecting a hand motion is carried out by software.

It is preferable to arrange all of the detectors 33 to 37 in the feature detector 32. According to an embodiment of the present invention, only the histogram detector 33 may be arranged in the feature detector 32 because the histogram detector 33 alone can detect a hand motion.

Figure 7:
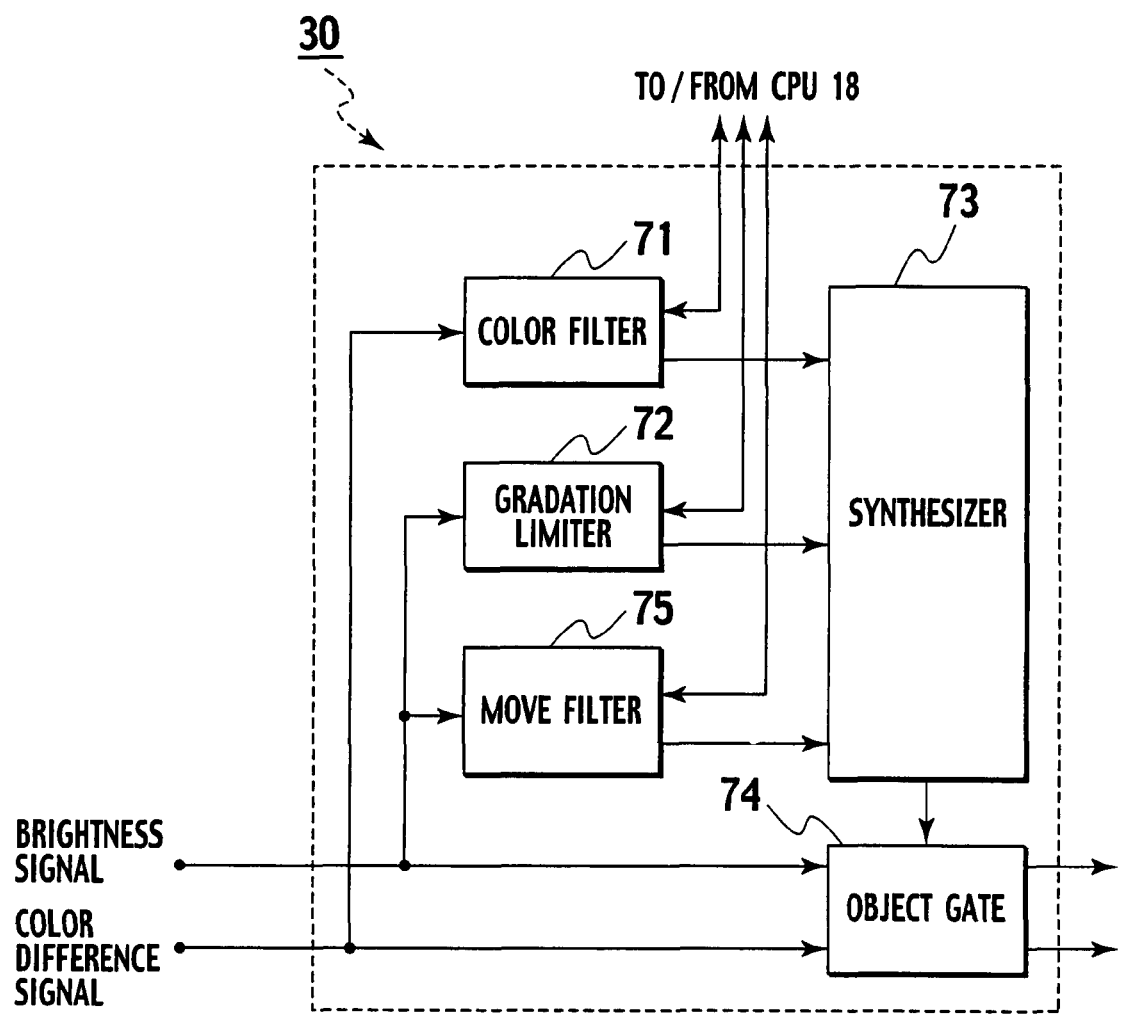
FIG. 7 is a block diagram showing an object extractor arranged in the detector of FIG. 6.

FIG. 7 is a block diagram showing an example of the object extractor 30. The object extractor 30 carries out filtering processes to detect a hand of the user 3. The object extractor 30 includes a color filter 71, a gradation limiter 72, a move filter 75, a synthesizer 73, and an object gate 74.

The color filter 71, gradation limiter 72, and move filter 75 are used to identify the characteristics of an object (hand). The color filter 71 limits the hue and color depth (degree of saturation) of a color signal composed of color difference signals. The gradation limiter 72 limits a specific gradation range in a brightness signal. The move filter 75 extracts and identifies a human hand according to a move in an image.

According to an embodiment of the present invention, a human hand is an item to manipulate one of the control buttons and is an object to be detected. The object extractor 30 can detect not only a human hand but also any object that manipulates one of the control buttons, if the hue and gradation parameters used by the object extractor 30 are adjusted.

The synthesizer 73 receives signals from the color filter 71, gradation limiter 72, and move filter 75 and synthesizes the received signals into an intraregional pulse. This intraregional pulse will be high if signals passed through the color filter 71, gradation limiter 72, and move filter 75 are all high (AND). It is possible to make the intraregional pulse high if there are one or two high-level signals passed through the color filter 71, gradation limiter 72, and move filter 75.

If the intraregional pulse is set to be high when there are two high-level signals passed through the color filter 71, gradation limiter 72, and move filter 75, erroneous detection will be prevented. If the intraregional pulse is set to be high when there are three high-level signals passed through the color filter 71, gradation limiter 72, and move filter 75, erroneous detection will more surely be prevented.

The intraregional pulse from the synthesizer 73 is supplied to the object gate 74. If the intraregional pulse is high, the object gate 74 passes the brightness and color difference signals. If the intraregional pulse is low, the object gate 74 blocks the brightness and color difference signals and outputs signals of predetermined values. According to the embodiment, the signals of predetermined values are a black-level brightness signal and color difference signals of saturation degree of zero.

The color filter 71 calculates the hue and color depth (degree of saturation) of a color signal consisting of color difference signals and determines whether or not the color difference signals are within predetermined regions in a color difference plane. The color difference plane has an x-axis serving as a B-Y axis and a y-axis serving as an R-Y axis. In the color difference plane, a hue is expressed with a left-turn angle with the B-Y axis in the first quadrant serving as a reference (zero degrees), and the degree of saturation is the scalar quantity of a vector. The origin of the color difference plane has a saturation degree of 0 with no color. The degree of saturation increases as it separates away from the origin, to increase the depth of color.

The embodiment determines whether or not given color difference signals are within regions of a skin color, i.e., a human hand color to be extracted. The present invention is not limited to extracting a skin color but it is applicable to extracting any other colors.

The gradation limiter 72 defines a specific gradation range for a brightness signal and passes a brightness signal whose gradation level is within the specific gradation range. According to the embodiment, the gradation limiter 72 passes a brightness signal whose gradation level is within a range of skin-color gradation levels.

The move filter 75 detects a move in an image according to an input brightness signal. According to the embodiment, the move filter 75 detects an object according to an image in which the object is present and an image in which the object is absent.

The color filter 75 passes a color signal consisting of color difference signals whose hue (angle) and saturation degree are within specified ranges. The gradation limiter 72 passes a brightness signal whose gradation level is within a specified range. The move filter 75 passes a brightness signal that indicates a move.

Limiting a hue and a saturation degree by the color filter 71 may pickup a human skin color. The human skin color, however, is affected by degrees of tan, races, and the like. Namely, there are various skin colors. An image signal supplied to the object extractor 30 is processed therein according to control signals provided by the CPU 18. Namely, in the object extractor 30, the color filter 71 checks the hue and saturation degree of each color difference signal of the image signal and passes the image signal if it has a skin color. The gradation limiter 72 checks the gradation level of a brightness signal of the image signal and passes the image signal if the gradation level is within a specified range. Consequently, the color filter 71 and gradation limiter 72 can roughly detect a human hand. The move filter 75 checks a move in the image signal and separates a hand area from a background. As a result, the object extractor 30 outputs an image signal in which the hand-area is defined.

According to the embodiment, an item to manipulate the control buttons 1-1 to 1-8 and to be extracted by the object extractor 30 is a human hand. By adjusting and optimizing the hue and gradation parameters used by the object extractor 30, any other item may be used to manipulate the control buttons and to be extracted by the object extractor 30.

The object gate 74 of FIG. 7 blackens areas excluding the hand area passed through the filters 71, 72, and/or 75 by zeroing the brightness and color difference signals supplied to the object extractor 30. Namely, the object gate 74 provides an image such as one shown in FIGS. 10A and 10B having a black background (hatched area) and a hand area. Blackening an entire area except a skin-color area improves a detection accuracy in the feature detector 32 that is arranged after the object gate 74. The color used for a background by the object gate 74 is not limited to black. It may be set to an optimum color depending on an object to detect.

An output signal from the object gate 74 is supplied to the timing gate 31 of FIG. 6. The timing gate 31 passes only the area of a corresponding one of the control buttons 1-1 to 1-8.

The feature detector 32 shown in FIG. 6 includes the histogram detector 33 to the maximum detector 37, to detect various characteristics from an image and generate detection signals. The detection signals from the detectors 33 to 37 are sent to the first to fifth motion detectors 181 to 185 of the CPU 18, respectively, to detect a hand motion. If a hand motion is detected, the control information generator 186 in the CPU 18 identifies a control operation associated with the control button (one of the control buttons 1-1 to 1-8) on which the hand motion has been detected and outputs a control signal to carry out the control operation on the television set 1.

The detectors 33 to 37 in the feature detector 32 are formed by hardware according to an embodiment of the present invention. These detectors provide data (detection signals) representative of features in the corresponding detection zone (one of the detection zones 2-1 to 2-8) field by field or frame by frame, i.e., every vertical period to the CPU 18 through a CPU bus.

The histogram detector 33 separates the gradation levels of a brightness signal provided by the timing gate 31 into, for example, eight stepwise groups (gradation levels 0 to 7), counts the number of pixels belonging to each group, and provides the first motion detector 181 with data indicative of a histogram per field or frame. The number (frequency) of pixels each having a gradation level of 0 is equal to the number of black pixels. According to the data (detection signal) per field or frame, the first motion detector 181 calculates the area of a hand in each of the detection zones 2-1 to 2-8, i.e., control buttons 1-1 to 1-8.

The average brightness detector 34 adds up gradation levels of each field or frame, divides the sum by the number of pixels, and provides the second motion detector 182 with an average brightness level of the field or frame.

The high-frequency detector 35 employs a spatial filter (two-dimensional filter) to extract high-frequency components and provides the third motion detector 183 with the quantity of the high-frequency components per field or frame. The minimum detector 36 provides the fourth motion detector 184 with a minimum gradation level of the brightness signal of the field or frame. The maximum detector 37 provides the fifth motion detector 185 with a maximum gradation level of the brightness signal of the field or frame.

Figure 8:
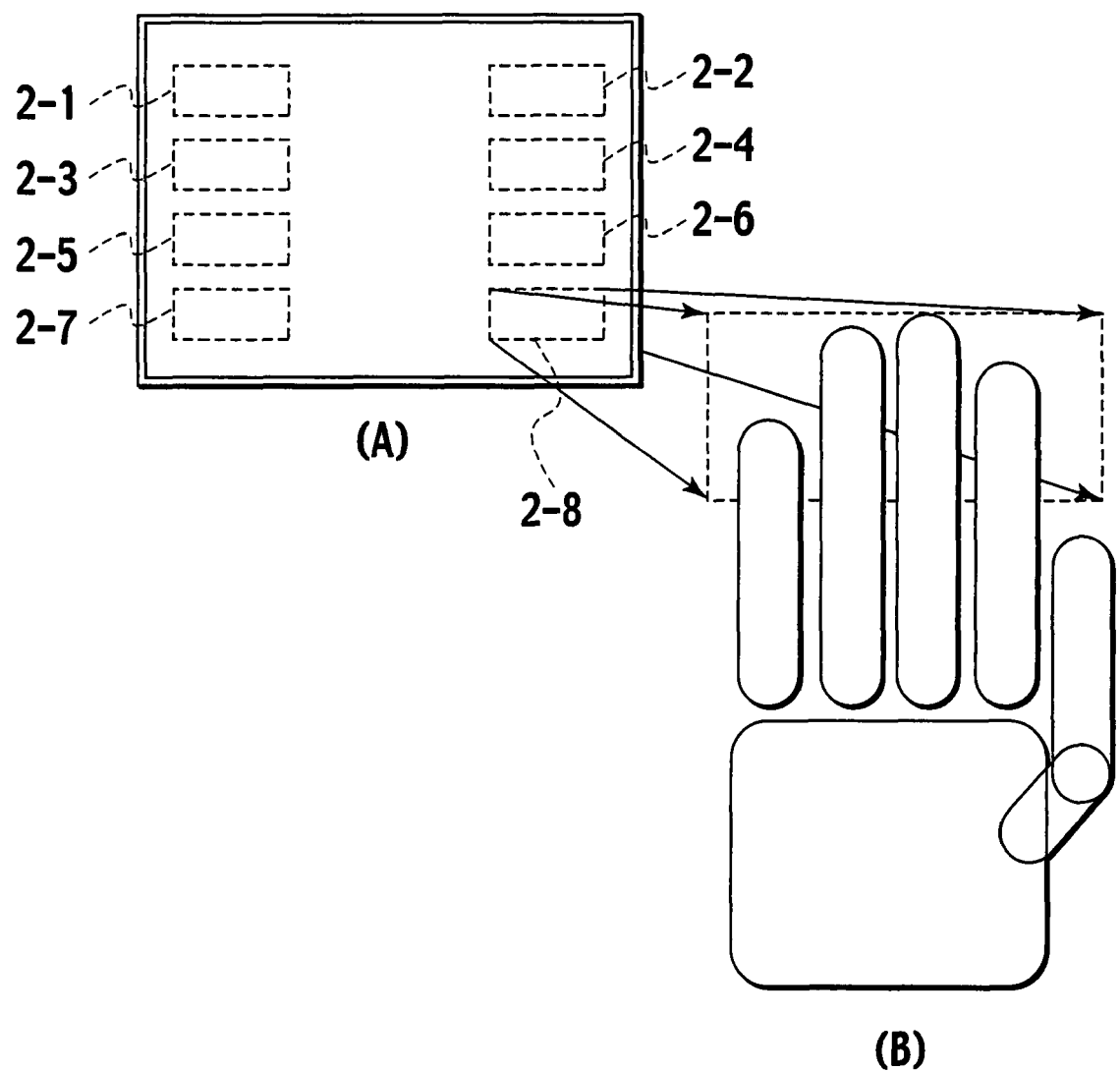
FIG. 8 is a view showing control buttons displayed on the display of FIG. 2 and a hand held on one of the control buttons.
Figure 9:
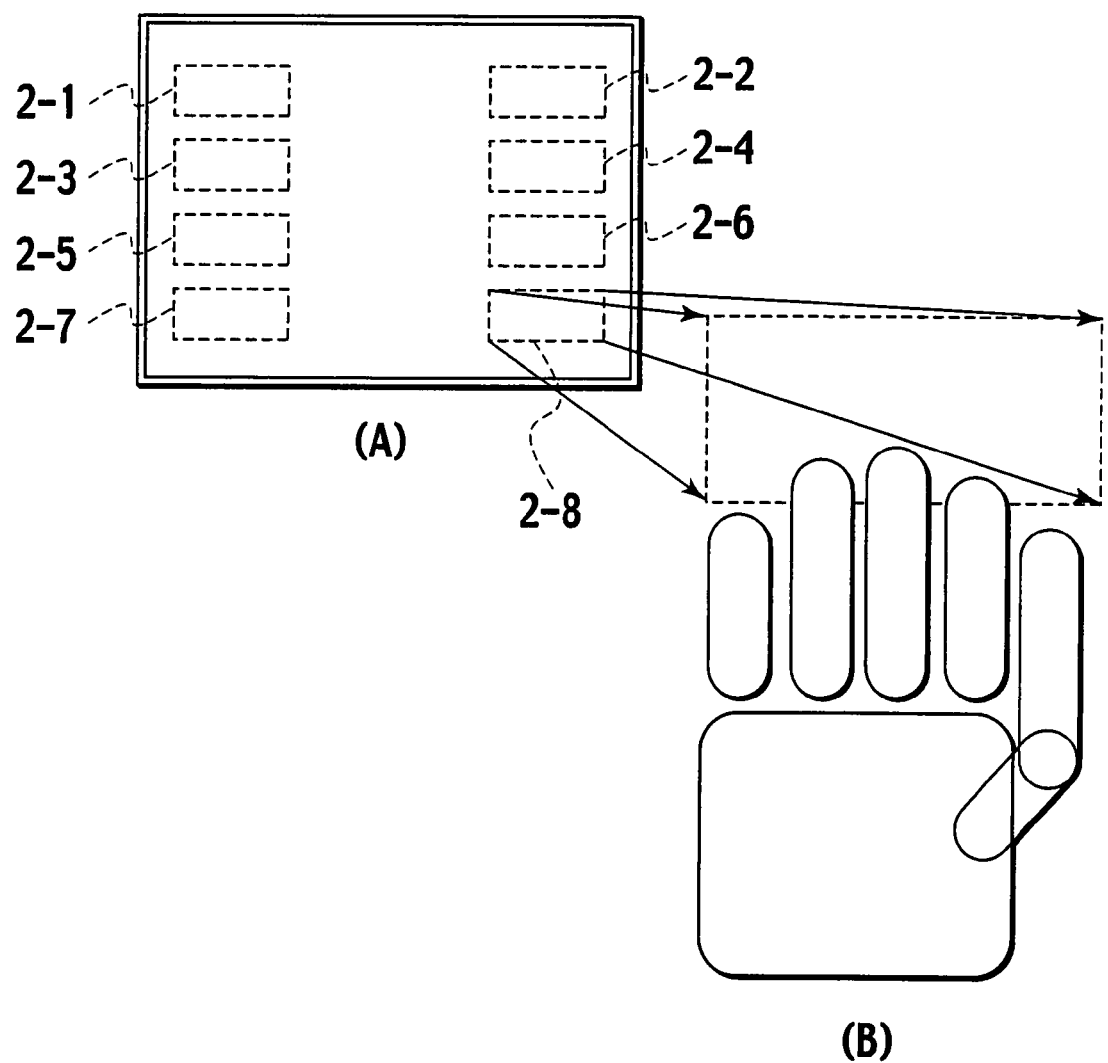
FIG. 9 is a view similar to FIG. 8 with the fingers of the hand being flexed on the objective control button.

Views (A) in FIGS. 8 and 9 show images from the video camera 2 on which the detection zones 2-1 to 2-8 ((B) of FIG. 4) are defined as indicated with dotted frames. As explained above, the user 3 moves his or her hand with respect to the detection zones 2-1 to 2-8 corresponding to the control buttons 1-1 to 1-8 ((A) of FIG. 4) displayed on the display 21, and the electronic appliance according to the present invention obtains control information from the hand motion.

Views (B) in FIGS. 8 and 9 show motions of the hand of the user 3. The view (B) of FIG. 8 shows the hand with the fingers stretched to cover the detection zone 2-8 corresponding to the control button 1-8. The view (B) of FIG. 9 shows the hand with the fingers bent. According to an embodiment of the present invention, bending fingers twice on a control button makes the CPU 18 recognize that the control button has been operated (pushed). Then, the CPU 18 outputs a control signal corresponding to the operated control button 1-8, to carry out a corresponding operation with respect to the electronic appliance. A pushing action on any one of the control buttons 1-1 to 1-8 may be accomplished only by projecting a hand onto the control button, or by bending the fingers of a hand once, thrice, or more, or by conducting any other action.

Figure 10A:
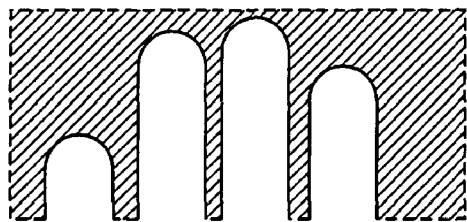
FIG. 10A is a view showing a control button image extracted by the object extractor of FIG. 7 from the state of FIG. 8.
Figure 10B:
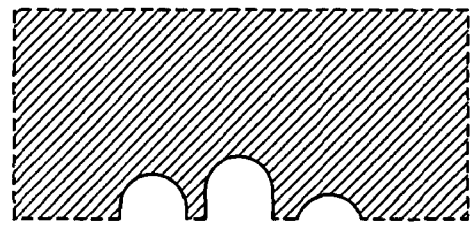
FIG. 10B is a view showing a control button image extracted by the object extractor of FIG. 7 from the state of FIG. 9.

FIGS. 10A and 10B show images formed from signals provided by the object extractor 30 shown in FIG. 7. The image of FIG. 10A is obtained when the fingers on the detection zone 2-8 are stretched as shown in the view (B) of FIG. 8, and the image of FIG. 10B is obtained when the fingers on the detection zone 2-8 are bent as shown in the view (B) of FIG. 9.

There are several techniques to determine the state of a hand or fingers from histogram data provided by the histogram detector 33. For example, a hand motion can be determined from the numbers of pixels whose gradation levels are in the range of 4 to 7.

It is understood from comparison between FIGS. 10A and 10B that, the finger-stretched state is distinguishable from the finger-bent state by examining the number of pixels having a gradation level of 0, i.e., black pixels in each state. This is because the number of black pixels contained in an output signal of the object extractor 30 differs between the finger-stretched state and the finger-bent state. Accordingly, it is possible to determine a hand motion according to the number of pixels having a gradation level of 0. Determining a hand motion according to only the number of pixels having a gradation level of 0 is advantageous in simplifying the state determination process carried out in the CPU 18.

With reference to views (A) and (B) of FIG. 11, motions of a hand will be explained along a time axis. An elapsed time from a finger stretched state to a finger bent state is Tm. T0, T1, . . . , and T7 are time points. At a left end of the view (B) of FIG. 11, there are schematically shown rectangles representing the control buttons 1-1 to 1-8 or the detection zones 2-1 to 2-8.

The period Tm from a finger stretched state to a finger bent state is used as a reference period of a hand motion. A period from T0 to T1 is approximately equal to the period Tm and is a period in which the hand is held with respect to the display 21. This period is used to determine whether or not the control button has been activated. Activating a control button means operating the control button by placing a hand on a detection zone corresponding to the control button.

At T−1, there is no hand. In a period from T1 to T2, the fingers of the hand are bent. In a period from T2 to T3, the fingers are stretched. In a period from T3 to T4, the fingers are again bent. In a period from T4 to T5, the fingers are again stretched. In a period from T5 to T6, the fingers are kept stretched for about the period Tm. A series of these motions of the fingers resembles a double clicking motion of a mouse, and therefore, can easily be carried out by an operator.

The motions of the hand mentioned above are carried out on one of the control buttons 1-1 to 1-8, i.e., the detection zones 2-1 to 2-8. The view (A) of FIG. 11 shows a waveform indicating changes in the area of the hand projected onto one of the control buttons. By analyzing the waveform, the hand motions can be identified.

When the fingers are stretched on one of the control buttons at T1, a black background is reduced in the control button or the detection zone as shown in FIG. 10A. As a result, the histogram detector 33 provides an output that shows a highest frequency (a largest number of pixels) around a gradation level of 5, and the average brightness detector 34 provides an output having a relatively high value. When the fingers are bent on the control button at T2, the black background is increased in the control button or the detection zone as shown in FIG. 10B. As a result, the histogram detector 33 provides an output that shows a low frequency around a gradation level of 5 and a high frequency at a gradation level of 0. At this time, the average brightness detector 34 provides an output having a relatively low value. Variations in the sum of histograms will nearly be equal to variations in the average brightness. Accordingly, the output of the histogram detector 33 and that of the average brightness detector 34 each are usable to determine a hand motion by analyzing the output.

Figure 12:
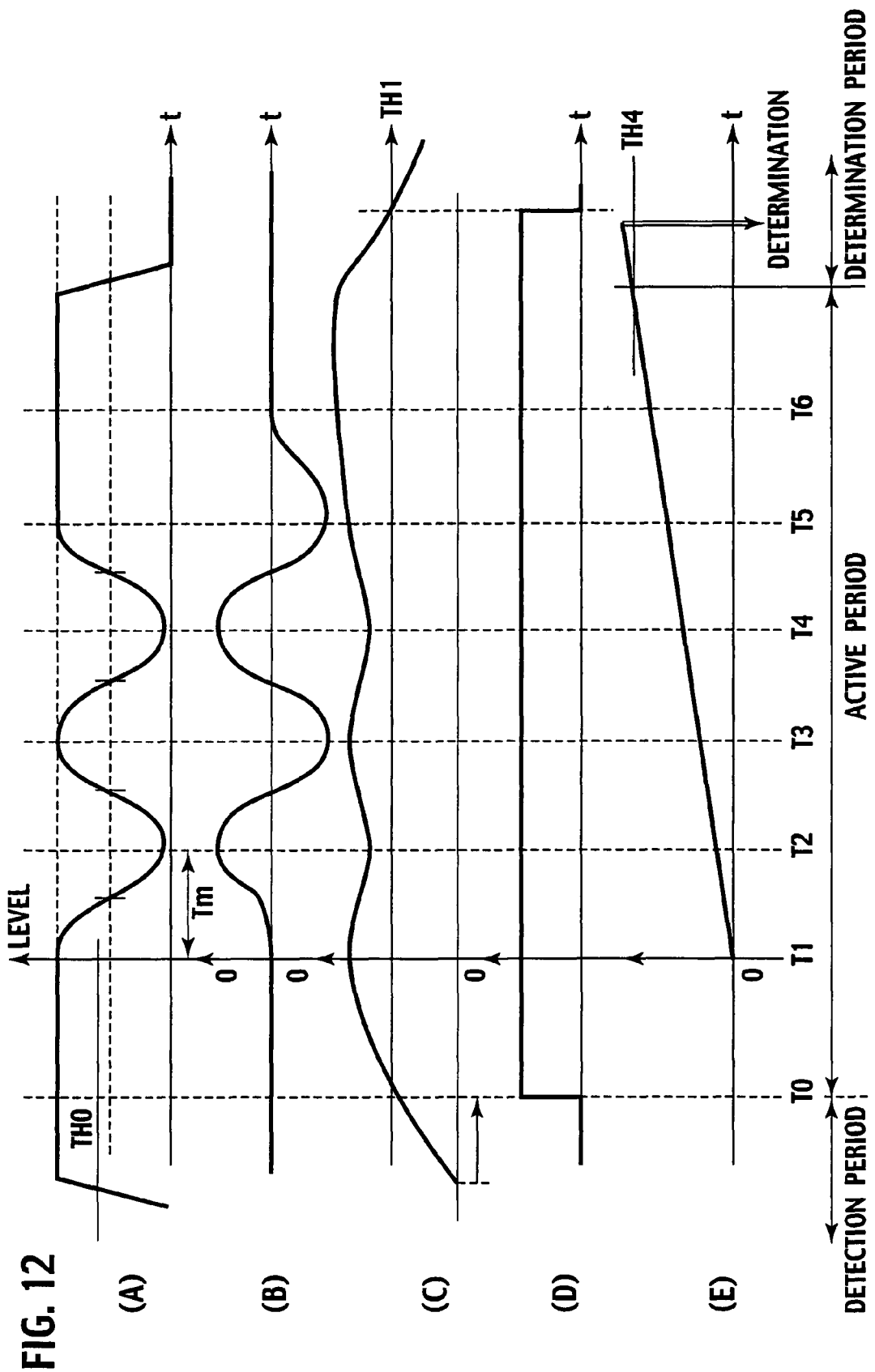
FIG. 12 is a view explaining operation of a motion detector arranged in the electronic appliance of FIG. 2.

FIG. 12 shows operation of the first to fifth motion detectors 181 to 185 in the CPU 18 for processing outputs from the feature detector 32. T0 to T6 of FIG. 12 correspond to T0 to T6 of FIG. 11, respectively.

A curve (A) of FIG. 12 is the same as the hand-motion representing waveform (A) of FIG. 11 and indicates changes in the area of a hand in the detection zone assigned to the control button on which the hand is placed. The curve (A) of FIG. 12 is provided as a detection signal from the histogram detector 33 to the first motion detector 181. Operation of the first motion detector 181 for processing the output of the histogram detector 33 will mainly be explained. The remaining second to fifth motion detectors 182 to 185 operate like the first motion detector 181. For example, an output from the average brightness detector 34, i.e., an average brightness (APL) waveform detected in the detection zone assigned to the control button in which the hand is detected is similar to the output from the histogram detector 33.

A curve (B) of FIG. 12 is a waveform prepared in the motion detector 181 by removing a DC offset component from the waveform (A) of FIG. 12. Removing a DC offset component is carried out with the use of a high-pass digital filter having tap coefficients of −½ and ½ around the period Tm. The digital filter subtracts a not-delayed signal from a delayed signal obtained by delaying the signal (A) of FIG. 12 by Tm and provides a difference signal. Thereafter, the digital filter multiplies the difference signal by ½, to provide the offset-component-removed signal (B) of FIG. 12. The delay by Tm is to pass a waveform corresponding to a hand motion.

A curve (C) of FIG. 12 is a waveform representing an integration of values greater than a threshold TH0 of the waveform (A) of FIG. 12 and is prepared in the first motion detector 181. In the curve (C) of FIG. 12, a period up to when the integrated value reaches a threshold TH1 is a detection period.

When the integrated value reaches the threshold TH1 in the curve (C) of FIG. 12, the first motion detector 181 generates an active flag shown in (D) of FIG. 12, to indicate an active period. The active flag is kept at high during a period in which the hand is on the control button, to indicate that the control button is selected.

A curve (E) of FIG. 12 shows an envelope prepared in the first motion detector 181 by passing the offset-component-removed waveform (B) of FIG. 12 through a cross-correlation digital filter. The curve (E) of FIG. 12 indicates a correlation to a hand motion. As time passes, the peak of the envelope (E) of FIG. 12 increases because the degree of coincidence of the curve (B) of FIG. 12 with a typical hand motion curve. When the peak of the envelope reaches a threshold TH4, a determination period starts and a correlation calculation is carried out to determine that a specific motion has been carried out with the hand.

When the waveform (A) of FIG. 12 is below the threshold TH0, an initialization is carried out. An algorithm of the correlation calculation to determine a hand motion is well known to persons skilled in the art, and therefore, will not be explained here.

Figure 13:
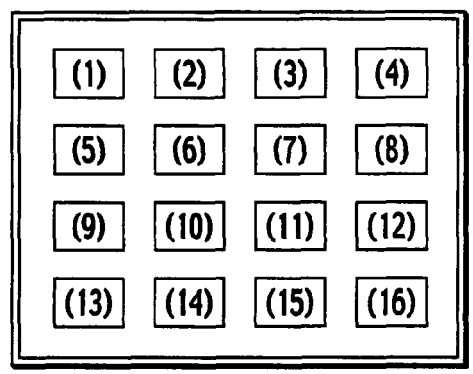
FIG. 13 is a view showing control buttons displayed on the display of FIG. 2 and numbers allocated to the control buttons.

A technique of selecting an active control button to control the electronic appliance (television set 1) according to an embodiment of the present invention will be explained. FIG. 13 shows an example of an arrangement of control buttons among which one is selected. In FIG. 13, the display 21 of FIG. 2 displays a menu containing 16 control buttons corresponding to 16 control operations to be carried out with respect to the television set 1. The control buttons are provided with identification numbers 1 to 16, respectively. For the control buttons 1 to 16, 16 detection zones are defined, respectively. For these detection zones, the detection unit 17 of FIG. 2 includes 16 detectors 171 to 1716.

Control operations associated with the control buttons 1 to 16 may include an operation of selecting one from among CS broadcasting, BS broadcasting, terrestrial digital broadcasting, video input, setting, and the like for the television set 1, an operation of selecting one of the channels of the television set 1, and an operation of turning on/off peripheral devices connected to the television set 1, such as a video cassette recorder and a DVD player.

Figure 14A:
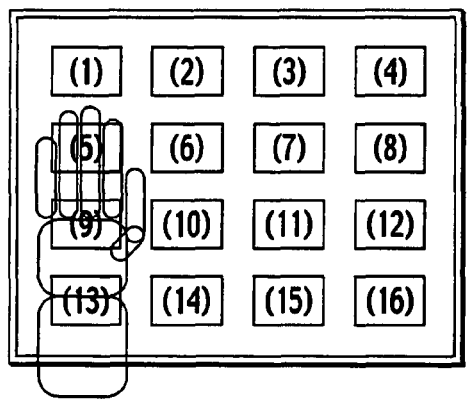
FIGS. 14A and 14B show the control buttons of FIG. 13 and a hand superimposed on some of the buttons.

FIG. 14A shows that the user 3 holds his or her hand on the control button 5. In practice, the hand is not only on the control button 5 but also on the control buttons 9 and 13.

As a result, the detectors 17n assigned to the detection zones corresponding to the control buttons 5, 9, and 13 generate active flags.

Figure 14B:
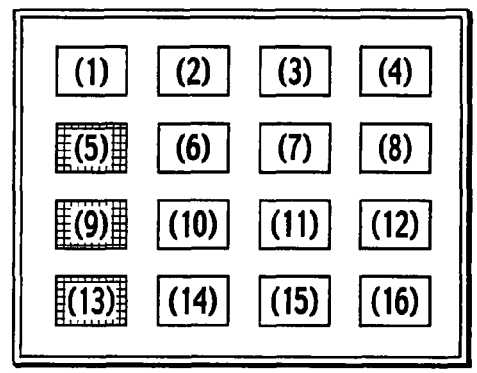

In FIG. 14B, the control buttons 5, 9, and 13 with high-level active flags are crosshatched and the hand of the user 3 is omitted for the sake of easy understanding. The control buttons 5, 9, and 13 with high-level active flags may be displayed in various ways.

A view (A) of FIG. 15 shows detection signals B[5], B[9], and B[13] representative of hand areas in the detection zones of the control buttons 5, 9, and 13 when the hand is over the control buttons 5, 9, and 13 as shown in FIG. 14A. The detection signal B[5] is generated by the detector 175 assigned to the detection zone of the control button 5. Similarly, the detection signals B[9] and B[13] are generated by the detectors 179 and 1713 assigned to the detection zones of the control buttons 9 and 13, respectively. Here, the number in "[ ]" is the control button number. These detection signals each correspond to the waveform (A) of FIG. 12. At a left end of the view, (A) of FIG. 15, there are shown the control buttons 5, 9, and 13 and the hand on these control buttons.

In the menu shown in FIG. 14A, the control buttons 5, 9, and 13 are vertically arranged in this order and the hand of the user 3 is moved from the bottom of the display 21 up to the control button 5. Namely, the user's hand covers the control buttons 13, 9, and 5 in this order. Due to this, the detector 1713 assigned to the control button 13 first provides the detection signal B[13] and the integrated value of the detection signal B[13] first reaches the threshold as shown in the view (A) of FIG. 15. Thereafter, the integrated value of the detection signal B[9] of the control button 9 reaches the threshold, and then, that of the detection signal B[5] of the control button 5 reaches the threshold.

A control button n corresponds to a detection zone to which a detector 17n is assigned and the detector 17n provides a detection signal B[n].

A view (B) of FIG. 15 shows active flags F[5], F[9], and F[13] corresponding to the control buttons 5, 9, and 13, respectively. An active flag F[i] is generated according to a detection signal B[i] as shown in (D) of FIG. 12. When the integrated value of the detection signal B[i] reaches the threshold as shown in (C) of FIG. 12, the active flag F[i] is raised to high. The view (B) of FIG. 15 also shows that the control buttons 5, 9, and 13 change their colors when their active flags F[5], F[9], and F[13] are raised. In the view (B) of FIG. 15, a control button is represented with a white rectangle when it is inactive and with a crosshatched rectangle when it is active. The color of a control button is changed by the CPU 18 according to the state of an active flag F[i] corresponding to the control button.

As shown in the view (B) of FIG. 15, the active flags F[13], F[9], and F[5] rise in this order.

When the fingertips of the user's hand come onto the control button 5 as shown in FIG. 14A, the user 3 stops to move the hand. At this time, the active flags F[5], F[9], and F[13] each are high, and therefore, it is impossible to determine which of the control buttons is an objective button of the user 3.

According to an embodiment of the present invention, bending fingers twice on a control button means specifying the control button as an objective control button. Accordingly, it is possible to select an objective control button from among the control buttons having high-level active flags and it is possible to carry out a control operation associated with the objective control button. In the view (A) of FIG. 15, the detection signals B[5] and B[9] of the control buttons 5 and 9 each indicate that the fingers have been bent twice. However, the amplitude of the detection signal B[5] is greater than that of the detection signal B[9], and therefore, it is possible to determine that the control button 5 is an objective control button.

Figure 16:
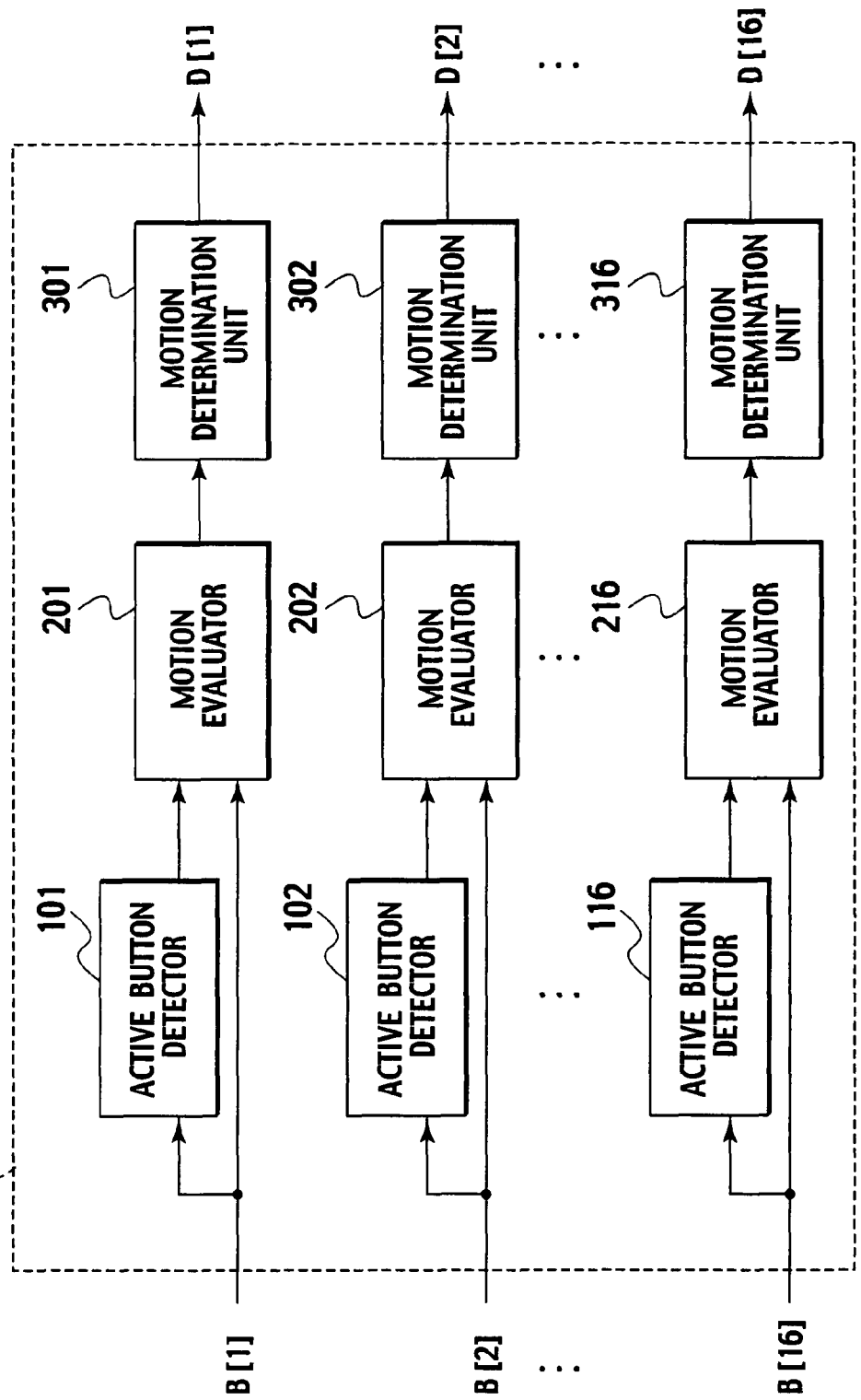
FIG. 16 is a block diagram showing an example of one of the motion detectors arranged in the electronic appliance of FIG. 2.

FIG. 16 is a block diagram showing an example of the first motion detector 181. The second to fifth motion detectors 182 to 185 each have the same configuration as the first motion detector 181.

The first motion detector 181 includes 16 active button detectors 101 to 116, motion evaluators 201 to 216, and motion determination units 301 to 316, corresponding to the 16 control buttons 1 to 16, respectively. The first motion detector 181 is realized by software.

Each of the active button detectors 101 to 116 determines whether or not a hand is in the detection zone of a corresponding one of the control buttons 1 to 16, and if the hand is in the detection zone, raises the active flag to "1" (high).

The active button detectors 101 to 116 receive the detection signals B[i] (i=1 to 16) each indicative of the area of a hand. The active button detectors 101 to 116 examine the detection signals B[i], and if the integration value shown in (C) of FIG. 12 reaches the threshold TH1, raises the active flags F[i] (i=1 to 16) shown in (D) of FIG. 12. The active flags are supplied to the motion evaluators 201 to 216.

Each of the motion evaluators 201 to 216 evaluates the active flag F[i] from a corresponding one of the active button detectors 101 to 116, and if the flag is high, carries out the correlation calculation shown in (E) of FIG. 12.

The motion determination units 301 to 316 receive outputs of the motion evaluators 201 to 216, respectively, and determine whether or not a finger twice bending motion has properly been carried out. According to the determinations, the motion determination units 301 to 316 provide determination flags D[1] to D[16], respectively. More precisely, each of the motion determination units 301 to 316 determines the finger twice bending operation by checking to see if the waveform (E) of FIG. 12 reaches the threshold TH4. The determination flags D[1] to D[16] are sent to the control information generator 186 of FIG. 6.

According to the determination flags, the control information generator 186 outputs a control signal to execute a control operation associated with the determined (objective) control button.

EXAMPLE 1

As explained above, the detection signals B[5] and B[9] shown in (A) of FIG. 15 have different amplitudes, and therefore, are usable to determine an objective control button (5) from among the control buttons 5 and 9. If a plurality of detection signals have the same amplitude, there is a possibility of selecting a plurality of objective control buttons.

Example 1 according to the present invention is a technique of selecting one control button from among a plurality of control buttons on which the hand of the user 3 is placed.

Figure 17A:
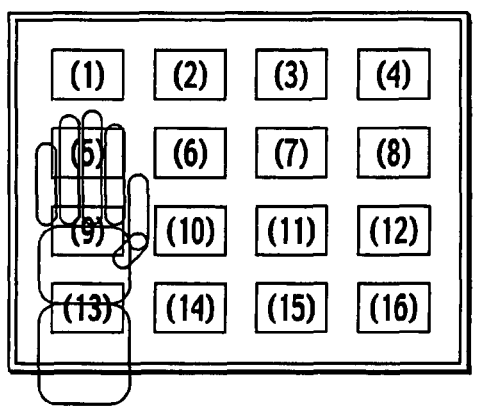
FIG. 17A is a view showing the control buttons displayed on the display and a hand superimposed on some of the buttons.

FIG. 17A shows a user's hand overlaid on control buttons 5, 9, and 13 like FIG. 14A. Among the control buttons 5, 9, and 13, the control button 5 is an objective control button in Example 1.

Figure 17B:
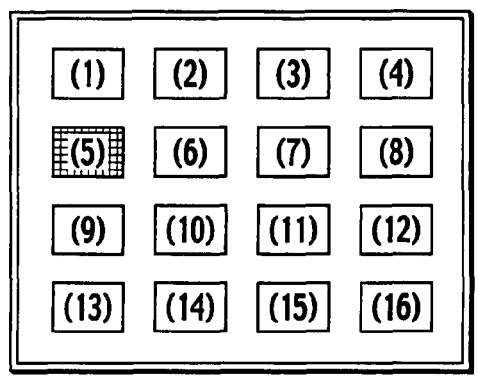
FIG. 17B is a view showing the control buttons of FIG. 17A with one of them being activated by the hand.

FIG. 17B shows the control button 5 activated according to Example 1.

Among the control buttons on which the user's hand is overlaid, Example 1 activates a control button (the control button 5) that is at an uppermost position on the display 21. This is because Example 1 uses a finger bending motion carried out on a control button as a determination motion, and therefore, a control button on which the fingers of the user 3 are placed is considered to be an objective control button.

This is based on an assumption that the user 3 is sitting or standing in front of the television set 1 and the fingers of the user's hand are oriented upwardly from the palm as shown in FIG. 17A. According to Example 1, there is no priority among control buttons arranged in the same horizontal row.

If situation requires, control buttons in the same horizontal row will be prioritized to select one objective control button.

Example 1 determines the order of priority in an ascending order of the numbers allocated for the control buttons. In FIG. 17A, the numbers of the control buttons ascend from top to bottom and from left to right. These numbers of the control buttons determine the order of priority of the control buttons.

FIG. 18 is a block diagram showing an example of the first motion detector 181 (FIG. 6) according to Example 1. The second to fifth motion detectors 182 to 185 each have the same configuration as the first motion detector 181.

In FIG. 18, the first motion detector 181 includes an active button detector 91, a button selector 92, a motion evaluator 93, and a motion determination unit 94. The active button detector 91 receives detection signals B[1] to B[16] of all of the 16 control buttons. The active button detector 91 examines the detection signals B[i] (i=1 to 16), detects a control button on which the user's hand is placed, and provides the button selector 92 with the number (one of 1 to 16) of the detected control button. At the same time, the active button detector 91 generates active flags F[i] (i=1 to 16) according to the detection signals B[i]. The active flags F[i] are supplied to the motion evaluator 93 and motion determination unit 94.

The motion evaluator 93 is the same as the motion evaluators 201 to 216 explained above, and the motion determination unit 94 is the same as the motion determination units 301 to 316 explained above. The motion determination unit 94 provides the control information generator 186 with determination flags D[i] (i=1 to 16).

If the active button detector 91 detects a plurality of control buttons on which the hand is superimposed, it provides the button selector 92 with the number of a control button having the highest priority.

The motion evaluator 93 and motion determination unit 94 evaluate and determine a motion of the hand according to the detection signal B[i] of the selected control button during the active flag F[i] is high as shown in (D) of FIG. 12.

Figure 19:
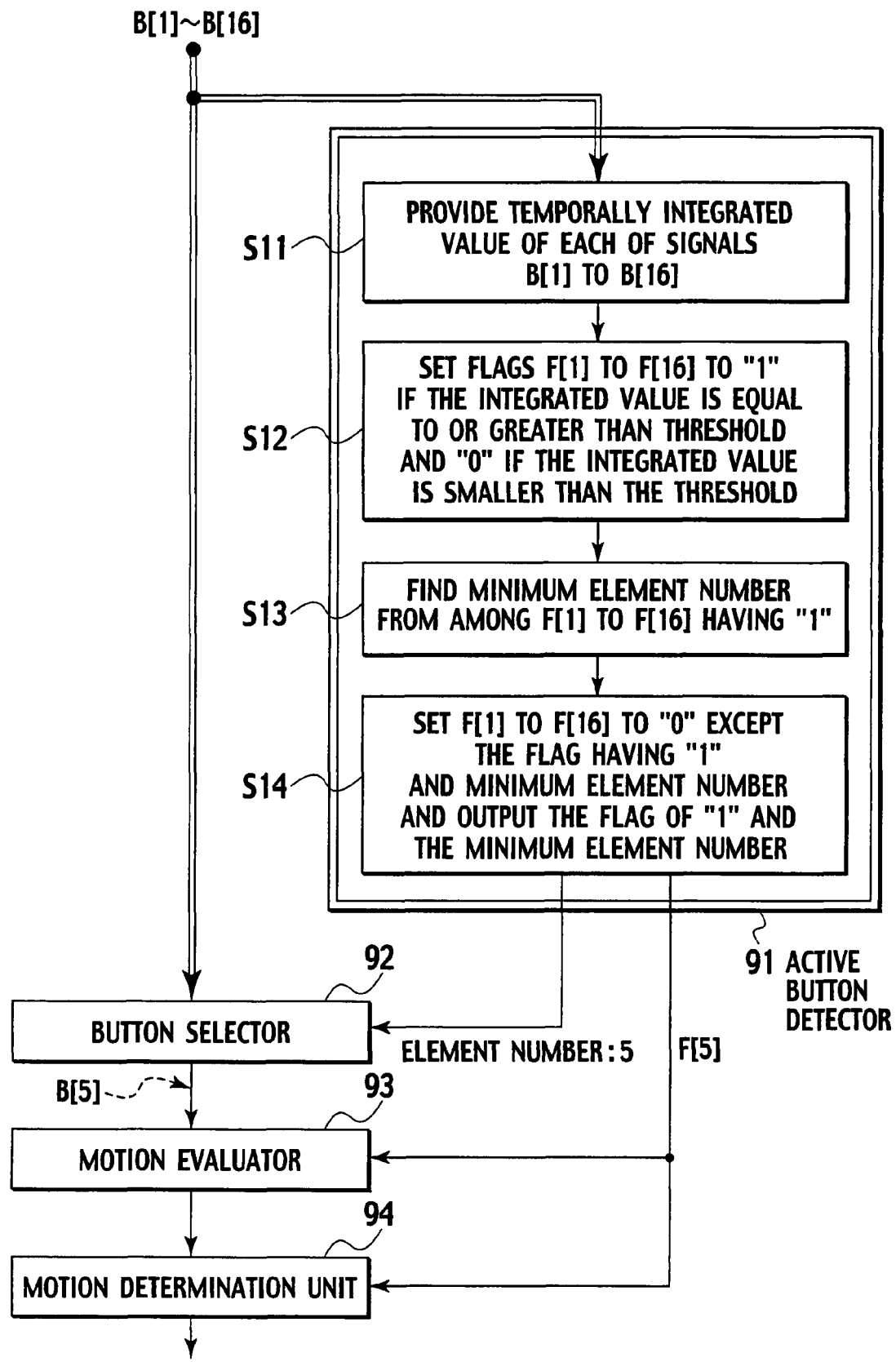
FIG. 19 is a block diagram showing the details of the motion detector of FIG. 18.

FIG. 19 is a flowchart showing a process carried out by the active button detector 91 to detect a control button on which the hand is placed.

The active button detector 91 receives detection signals B[1] to B[16] from all of the 16 control buttons. In step S11, the active button detector 91 integrates each of the detection signals B[1] to B[16] along a time axis to find an integrated value.

According to Example 1, data is handled every vertical period after the feature detector 32 and the data is used to form the waveform (A) of FIG. 12 that is sent to the CPU 18. In step S11, each of the detection signals B[1] to B[16] is integrated for a vertical period with the use of, for example, a first-order recursive filter.

In step S12, the active button detector 91 compares each of the integrated values with a threshold and generates active flags F[1] to F[16] each having "1" (high) if the corresponding integrated value is equal to or larger than the threshold or "0" (low) if the integrated value is lower than the threshold.

In step S13, the active button detector 91 selects one of the active flags F[1] to F[16] that is "1" and has a smallest button number and saves the selected button number (element number). In step S14, the active button selector 91 sets the active flags F[i] except that having the selected button number to "0" so that only the active flag having the selected button number may have "1." The active flag having the selected button number is sent to the motion evaluator 93 and motion determination unit 94. The selected button number is sent to the button selector 92.

The button selector 92 selects a detection signal having the selected button number from among the detection signals B[1] to B[16] and sends the selected detection signal to the motion evaluator 93.

Operation of the active button detector 91 in the case of FIG. 17 will be explained. The detection signals B[5], B[9], and B[13] of the control buttons 5, 9, and 13 provide integrated values each exceeding the threshold. Accordingly, the active button detector 91 sets the flags F[5], F[9], and F[13] to "1" and the other flags to "0."

From among the flags F[5], F[9], and F[13], the active button detector 91 selects the flag F[5] having a smallest button number and changes the flags F[9] and F[13] to "0." The active button detector 91 sends the flag F[5] to the motion evaluator 93 and motion determination unit 94, and at the same time, the button number 5 to the button selector 92.

The button selector 92 selects the detection signal B[5] from among the received detection signals B[1] to B[16] and sends the selected one to the motion evaluator 93.

A view (A) of FIG. 20 shows temporal changes in the detection signals B[5], B[9], and B[13] from the detection zones of the control buttons 5, 9, and 13 on which the hand is superimposed. The view (A) of FIG. 20 corresponds to the view (A) of FIG. 15 and the view (A) of FIG. 12. At a left end of the view (A) of FIG. 20, there are shown the hand and control buttons 5, 9, and 13 under the hand.

A view (B) of FIG. 20 shows the active flags F[5], F[9], and F[13] corresponding to the control buttons 5, 9, and 13. In the view (B) of FIG. 20, the color of the control buttons 5, 9, and 13 is changed. Namely, the control buttons are white when their active flags are low and are crosshatched when their active flags are high.

As explained above, the hand is moved upwardly from the bottom of the display 21. Accordingly, the hand covers the control buttons in order of 13, 9, and 5. In the view (A) of FIG. 20, the integrated value of the detection signal B[13] from the detector 1713 of the control button 13 first reaches the threshold. Thereafter, the integration value of the detection signal B[9] of the control button 9 and then that of the detection signal B[5] of the control button 5 reach the threshold.

Unlike the view (B) of FIG. 15, the view (B) of FIG. 20 shows that the active flag F[13] based on the detection signal B[13] first becomes high, and when the active flag F[9] becomes high, drops to low. Similarly, the active flag F[9] becomes low when the active flag F[5] becomes high.

As explained above, Example 1 makes only one active flag F[i] having a smallest button number high.

When the hand on the control button 5 is removed, the hand is moved in order of the control buttons 5, 9, and 13. Accordingly, the active flags F[5], F[9], and F[13] are made high in this order.

The active flags change as shown in (B) of FIG. 20. At this time, the user 3 conducts a finger twice bending motion on the control button 5 because the control button 5 is an objective control button of the user 3. Once a control operation associated with the control button 5 is determined, all of the active flags including the active flag F[5] are reset to an initial state.

EXAMPLE 2

Example 2 according to the present invention is another technique of selecting one control button from among a plurality of control buttons on which the user 3 is superimposed. In Example 2, not only the hand of the user 3 but also the face of the user 3 are superimposed on a plurality of control buttons including the control button 5 that is an objective control button.

Figure 21A:
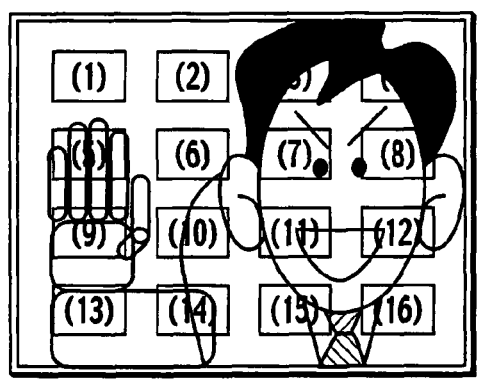
FIG. 21A is a view showing control buttons displayed on the display and the hand and face of an operator superimposed on some of the buttons.
Figure 21B:
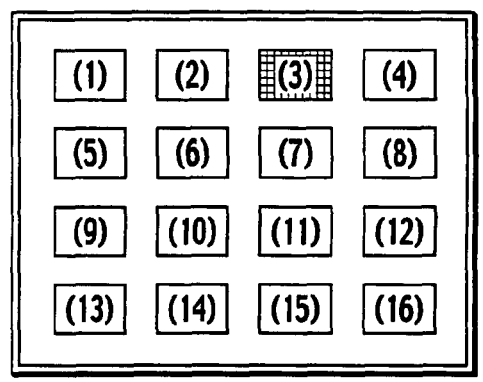
FIG. 21B is a view showing the control buttons of FIG. 21A with one of them being activated by the operator's image.

The object extractor 30 extracts objects according to specific colors, gradation levels, and move, and therefore, detects the face as well as the hand. According to Example 1, an active flag having a smallest button number is selected from among high-level active flags F[i]. Accordingly, in the case of FIG. 21A, the active flag F[3] of the control button 3 is selected as shown in FIG. 21B. This is because the face of the user 3 is superimposed on the control buttons as shown in FIG. 21A. If this happens, the active flag of the objective control button 5 intended by the user 3 will not become high.

As a result, the control operation associated with the control button 5 will not be executed even if the user 3 conducts a finger twice bending operation on the control button 5.

Figure 22A:
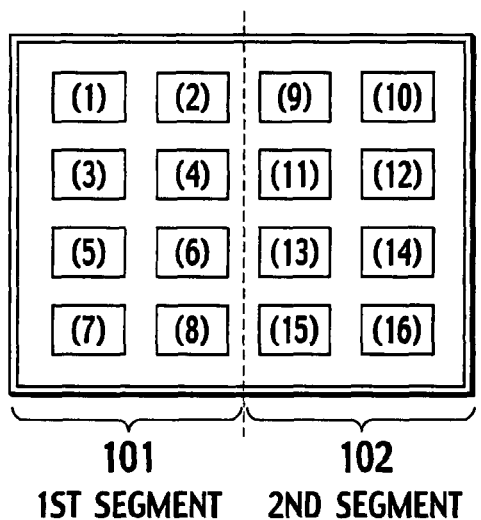
FIGS. 22A and 22B are views explaining segments into which control buttons are divided.
Figure 22B:
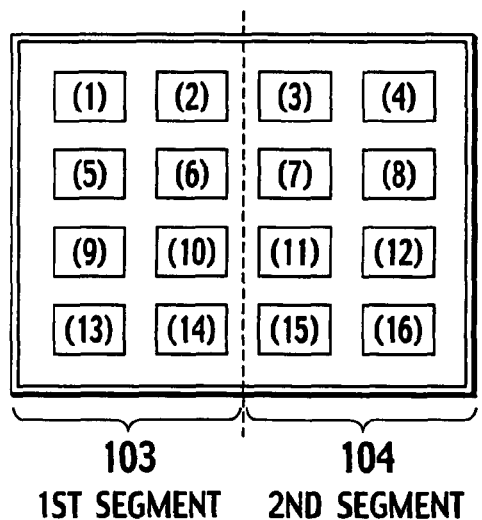

To avoid this problem, Example 2 divides control buttons contained in a menu to be displayed into a plurality of segments so that each segment may provide one active flag of high level. In FIGS. 22A and 22B, control buttons are divided into two segments that are arranged side by side.

In FIG. 22A, the control buttons in each segment are provided with serial numbers. In FIG. 22B, the control buttons are provide with serial numbers like FIG. 21A, and then, are divided into two segments.

In FIG. 22A, the first segment 101 includes the control buttons 1 to 8 and the second segment 102 includes the control buttons 9 to 16. In FIG. 22B, the first segment 103 includes the control buttons, 1, 2, 5, 6, 9, 10, 13, and 14 and the second segment 104 includes the control buttons 3, 4, 7, 8, 11, 12, 15, and 16.

In each segment in each of FIGS. 22A and 22B, the control buttons having smaller numbers are arranged at higher positions. This is because the fingertips are on an upper side of the palm on the display 21. In each segment, the control button numbers ascend from left to right and from top to bottom. Namely, a control button having the smallest number in a given segment is at a top left position of the segment.

The numbers assigned to the control buttons may start from "1" in each segment. In this case, the control button numbers and segment numbers are usable to specify an objective control button.

Selecting an objective control button (control button 3) when the hand and face of the user 3 are superimposed on control buttons including the objective control button 3 will be explained with reference to FIGS. 23A and 23B in which the control buttons are arranged like FIG. 22A.

Figure 23A:
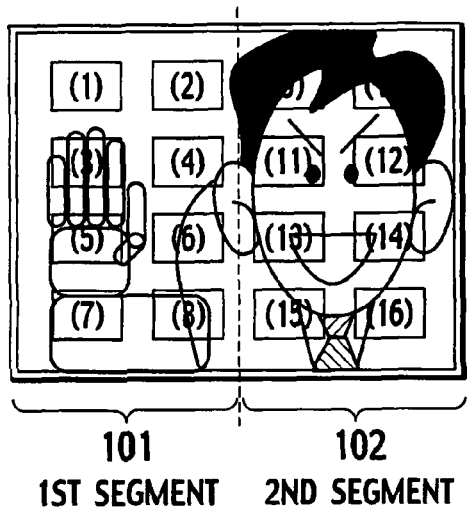
FIG. 23A is a view showing the control buttons divided into the segments of FIG. 22A and the hand and face of an operator superimposed on some of the buttons.
Figure 23B:
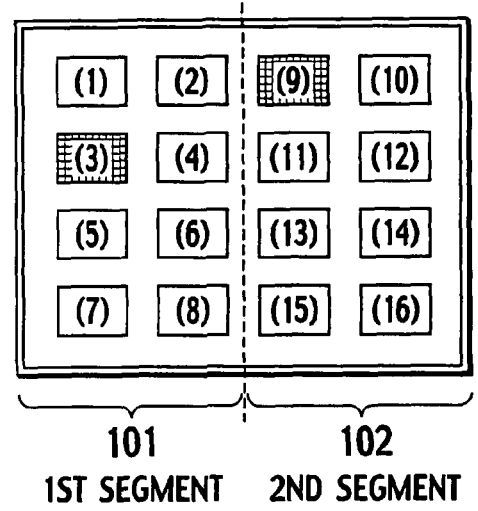
FIG. 23B is a view showing the control buttons of FIG. 23A with one of them being activated in each segment.

In a first segment 101 of FIG. 23A, an active flag F[3] of the control button 3 is set to high, and in a second segment 102, an active flag F[9] of a control button 9 is set to high. In FIG. 23B, the control buttons 3 and 9 change their images to indicate that they have been pushed.

On the control button 3, the user 3 conducts a finger bending operation, and therefore, a control operation assigned to the control button 3 is chosen. However, on the control button 9 on which the face of the user 3 is superimposed, no finger bending operation is carried out to choose a control operation assigned to the control button 9. As a result, the intended control operation is carried out even under the state with the two active flags F[3] and F[9] being high.

Figure 24:
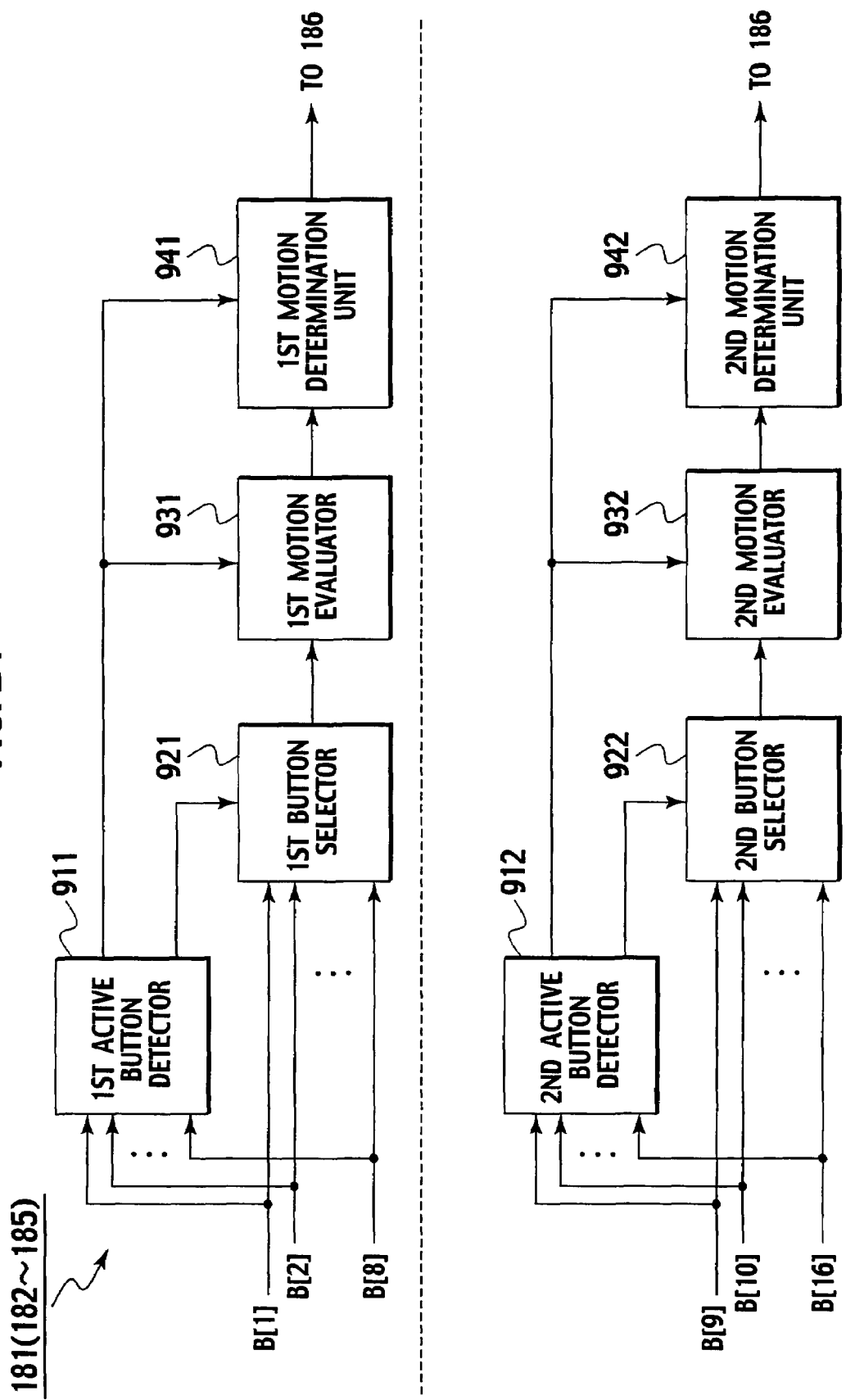
FIG. 24 is a block diagram showing another example of one of the motion detectors.

FIG. 24 is a block diagram showing an example of the first motion detector 181 according to Example 2. Each of the second to fifth motion detectors 182 to 185 has the same configuration as the first motion detector 181.

In FIG. 24, the first motion detector 181 includes a first active button detector 911, a second active button detector 912, a first button selector 921, a second button selector 922, a first motion evaluator 931, a second motion evaluator 932, a first motion determination unit 941, and a second motion determination unit 942. Namely, the first motion detector 181 according to Example 2 has, for each segment, a set of the active button detector, button selector, motion evaluator, and motion determination unit.

According to Example 2, the first motion detector 181 has two sets of the active button detector, button selector, motion evaluator, and motion determination unit for the two segments 101 and 102 of FIG. 23A, respectively. The first set includes the first active button detector 911, first button selector 921, first motion evaluator 931, and first motion determination unit 941. The second set includes the second active button detector 912, second button selector 922, second motion evaluator 932, and second motion determination unit 942.

The first active button detector 911 receives detection signals B[1] to B[8] corresponding to the control buttons 1 to 8 in the first segment 101. The first active button detector 911 is the same as the active button detector 91 of FIG. 18. Namely, the first active button detector 911 examines the detection signals B[i], detects a control button on which the hand is placed, outputs the number (one of 1 to 8) of the detected control button, and generates a high-level active flag F[i]. The detected control button number is sent to the first button selector 921 and the active flag F[i] is sent to the first motion evaluator 931 and first motion determination unit 941.

The first motion evaluator 931 is the same as the motion evaluators 201 to 216 mentioned above. The first motion determination unit 941 is the same as the motion determination units 301 to 316 mentioned above.

The first button selector 921 receives the detection signals B[1] to B[8] corresponding to the eight control buttons. According to the button number provided by the first active button detector 911, the first button selector 921 selects the detection signal B[i] from the detector having the button number.

According to the detection signal B[i] of the selected control button during a period in which the active flag F[i] is high, the first motion evaluator 931 and first motion determination unit 941 evaluate and determine whether or not a predetermined motion has been carried out on the selected control button.

The second active button detector 912 receives detection signals B[9] to B[16] corresponding to the control buttons 9 to 16 in the second segment 102. The second active button detector 912 examines the detection signals B[i], detects a control button on which the hand is placed, outputs the number (one of 9 to 16) of the detected control button, and generates a high-level active flag F[i]. The detected control button number is sent to the second button selector 922 and the active flag F[i] is sent to the second motion evaluator 932 and second motion determination unit 942.

The second motion evaluator 932 is the same as the motion evaluators 201 to 216 mentioned above. The second motion determination unit 942 is the same as the motion determination units 301 to 316 mentioned above.

The second button selector 922 receives the detection signals B[9] to B[16] corresponding to the eight control buttons. According to the button number provided by the second active button detector 912, the second button selector 922 selects the detection signal B[i] from the detector corresponding to the button number.

According to the detection signal B[i] of the selected control button during a period in which the active flag F[i] is high, the second motion evaluator 932 and second motion determination unit 942 evaluate and determine whether or not a predetermined motion has been carried out on the selected control button.

The arrangement shown in FIG. 24 can be realized by software. In this case, the motion detector will be a function if written in C language. The function is called segment by segment. The number of control buttons in a given segment, a first control button number, and the like are given as arguments of the function when processing the given segment with the function. It is possible to realize the arrangement of FIG. 24 by hardware. Realizing by software is more advantageous than realizing by hardware because a processing scale is substantially unchanged without regard to whether or not control buttons are divided into segments if the total number of control buttons is unchanged.

Figure 25A:
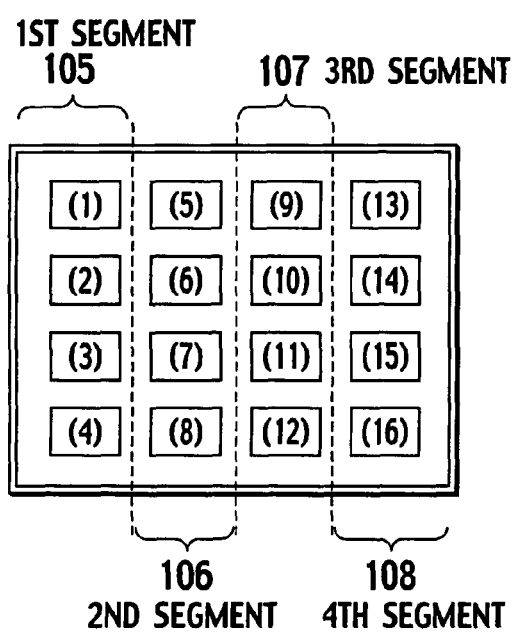
FIGS. 25A and 25B are views explaining examples of segments into which control buttons are divided.
Figure 25B:
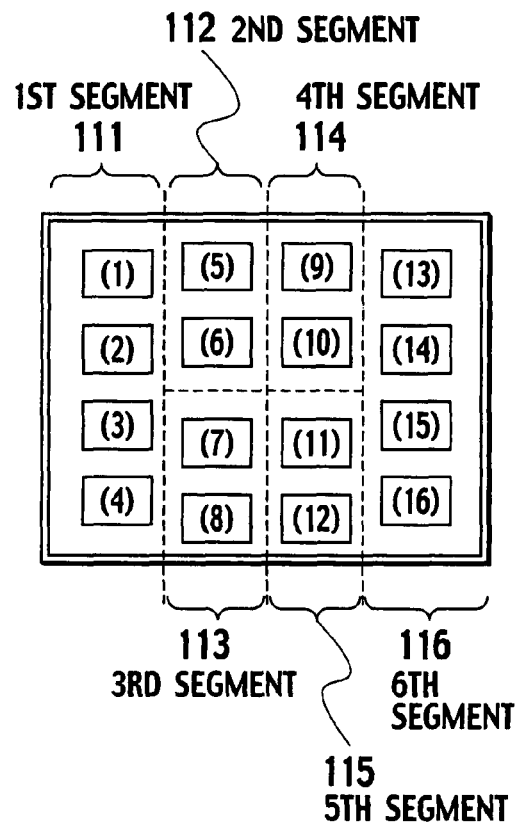

FIGS. 25A and 25B show examples of segments according to embodiments of the present invention. In FIG. 25A, 16 control buttons are arranged in a 4×4 matrix on the display 21 and are divided into four segments each containing a vertical column of four control buttons. From left to right on the display 21, the four segments are a first segment 105, a second segment 106, a third segment 107, and a fourth segment 108. Numbers allocated to the control buttons ascend from top to bottom and from left to right.

In FIG. 25B, 16 control buttons are divided into six segments 111 to 116 on the display 21. The leftmost first segment 111 includes a vertical column of four control buttons 1 to 4. The rightmost sixth segment 116 includes a vertical column of four control buttons 13 to 16. Each of the central second to fifth segments 112 to 115 includes two of the remaining eight control buttons 5 to 12.

When dividing control buttons into segments, a given segment may contain any number of control buttons. It is preferable to divide control buttons into vertically extending segments and prioritize the control buttons in each segment according to numbers allocated to the control buttons, so that each of the control buttons can smoothly be chosen. It is preferable to divide control buttons contained in a menu into segments depending on the nature of the menu, so that the usability of the menu may improve. It is preferable to group a variety of control functions segment by segment.

According to Example 2, control buttons in a menu displayed on the display 21 are prioritized, and one of the control buttons is chosen according to a finger twice bending operation (spatial clicking operation). The control buttons are divided into segments so that an objective one of the control buttons can be selected even if not only the hand of the user 3 but also other parts of the user 3 are superimposed on the control buttons. Each segment is provided with the motion evaluator (931, 932) so that each segment may be controlled according to arguments. Namely, each segment may accept a motion specific to the segment. For example, different segments may accept different numbers of clicking operation. According to Example 2, a variety of control motions usable by sharing function blocks without expanding a processing scale.

The present invention is not limited to the above-mentioned embodiments and examples. For example, control buttons can be prioritized not only in an ascending order of control button numbers but also in a descending order of control button numbers. In this case, the control buttons are also arranged in the descending order. An item that performs a control motion (spatial clicking operation) with respect to a control button is not limited to the hand of a user. The item may be a stick or a light emitting object serving as the foot or hand of a user. Instead of allocating serial numbers to control buttons, a series of marks such as alphabets may be allocated to control buttons. The present invention is applicable not only to television sets but also to other electronic appliances having displays.

More generally, it should be understood that many modifications and adaptations of the invention will become apparent to those skilled in the art and it is intended to encompass such obvious modifications and changes in the scope of the claims appended hereto.

What is claimed is:

1. An apparatus for controlling an electronic appliance having a display, comprising:
    a video camera configured to photograph an operator who is in front of the display and operates the electronic appliance;
    a mirror image converter configured to convert an image provided by the video camera into a mirror image;
    an operational image generator configured to generate an operational image containing a plurality of control buttons for controlling the electronic appliance, each control button being assigned to different control operations of the electronic appliance;
    a mixer configured to mix the operational image with the mirror image into a mixed image to be displayed on the display;
    a detector configured to have a plurality of detection zones corresponding to the plurality of control buttons respectively for the image provided by the video camera and generate a detection signal characterized by first detectable amounts indicating whether the operator displayed on the display overlays an item on any of the plurality of detection zones based on images of the detection zones and second detectable amounts indicating whether the operator operates any of the control buttons corresponding to detection zones on which the item is overlaid based on the images of the detection zones; and
    a controller configured to group the plurality of detection zones into a plurality of simultaneously displayed segments on the display, each segment having a plurality of detection zones, set an order of priority for detection zones included in each segment, and if it is determined on the basis of the first detectable amounts that a plurality of detection zones in the plurality of segments are overlaid with the item by the operator displayed on the display, obtain a plurality of first detectable amounts from detection zones each having a highest priority in each segment and generate a control signal for controlling the electronic appliance according to a control button corresponding to a detection zone that has generated a second detectable amount among the detection zones each having a highest priority in each segment.

2. The apparatus of claim 1, wherein the detector comprises:
    a color filter configured to extract an area having a specific color from the mirror image, the extracted area being used to detect the item overlaid on the detection zones.

3. The apparatus of claim 2, wherein the detector further comprises:
    a gradation limiter configured to extract an area having a predetermined gradation range from the mirror image; and
    a synthesizer configured to extract an area corresponding to the item according to the area extracted by the color filter and the area extracted by the gradation limiter.

4. The apparatus of claim 3, wherein the detector further comprises:
    a gate configured to provide areas other than the item area extracted by the synthesizer with one of a specific brightness and a specific color.

5. A method of controlling an electronic appliance having a display, comprising:
    photographing an operator who is in front of the display and operates the electronic appliance;
    converting a photographed image into a mirror image;
    generating an operational image containing a plurality of control buttons for controlling the electronic appliance, each control button being assigned to different control operations of the electronic appliance, the plurality of control buttons having a plurality of detection zones corresponding thereto respectively, the plurality of detection zones being grouped into a plurality of simultaneously displayed segments on the display, each segment having a plurality of detection zones, the plurality of detection zones being set in an order of priority in each segment;
    mixing the operational image with the mirror image into a mixed image to be displayed on the display;
    generating detection signals characterized by first detectable amounts indicating whether the operator displayed on the display overlays an item on any of the plurality of detection zones based on images of the detection zones and second detectable amounts indicating whether the operator operates any of the control buttons corresponding to detection zones on which the item is overlaid based on the images of the detection zones; and
    if it is determined on the basis of the first detectable amounts that a plurality of detection zones in the plurality of segments are overlaid with the item by the operator displayed on the display, obtaining a plurality of first detectable amounts from detection zones each having a highest priority in each segment and generating a control signal for controlling the electronic appliance according to a control button corresponding to a detection zone that has generated a second detectable amount among detection zones each having a highest priority in each segment.

6. The method of claim 5, wherein detecting, from among the control zones comprises:

extracting an area having a specific color from the mirror image, the extracted area being used to detect the item overlaid on the detection zones.

7. The method of claim 6, wherein detecting, from among the control zones further comprises:

extracting an area having a predetermined gradation range from the mirror image; and extracting an area corresponding to the item according to the extracted specific color area and the extracted specific gradation range area.

8. The method of claim 7, wherein detecting, from among the control zones further comprises:

providing areas other than the item area extracted by the synthesizer with one of a specific brightness and a specific color.

* * * * *